US011381651B2

(12) United States Patent
Zhao et al.

(10) Patent No.: US 11,381,651 B2
(45) Date of Patent: Jul. 5, 2022

(54) INTERPRETABLE USER MODELING FROM UNSTRUCTURED USER DATA

(71) Applicant: ADOBE INC., San Jose, CA (US)

(72) Inventors: Handong Zhao, San Jose, CA (US); Zhiqiang Tao, Medford, MA (US); Zhaowen Wang, San Jose, CA (US); Sheng Li, Suwanee, GA (US); Chen Fang, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 21 days.

(21) Appl. No.: 16/424,949

(22) Filed: May 29, 2019

(65) Prior Publication Data

US 2020/0382612 A1 Dec. 3, 2020

(51) Int. Cl.

| | |
|---|---|
| ***H04L 29/08*** | (2006.01) |
| ***G06N 3/08*** | (2006.01) |
| ***G06N 3/04*** | (2006.01) |
| ***H04L 67/50*** | (2022.01) |
| ***H04L 67/306*** | (2022.01) |

(52) U.S. Cl.

CPC ............. *H04L 67/22* (2013.01); *G06N 3/049* (2013.01); *G06N 3/08* (2013.01); *H04L 67/306* (2013.01)

(58) Field of Classification Search

CPC ....... H04L 67/22; H04L 67/306; H04L 43/00; H04L 67/02; G06N 3/02; G06N 3/08; G06N 3/049; G06N 3/082; G06N 3/0454; G06N 3/084; G06N 3/0445; G06F 9/44505; G06F 11/34; G06F 16/9535; G06Q 30/00

See application file for complete search history.

(56) References Cited

U.S. PATENT DOCUMENTS

| | | | | |
|---|---|---|---|---|
| 10,198,693 | B2 * | 2/2019 | Dong | B60W 50/06 |
| 10,216,983 | B2 * | 2/2019 | Tu | A61B 5/0077 |
| 10,339,470 | B1 * | 7/2019 | Dutta | G06N 20/20 |

(Continued)

FOREIGN PATENT DOCUMENTS

| | | | | |
|---|---|---|---|---|
| KR | 101880907 B1 * | 8/2018 | | G06N 3/04 |

OTHER PUBLICATIONS

Yang, Longqi, Chen Fang, Hailin Jin, Matthew D. Hoffman, and Deborah Estrin. "Personalizing software and web services by integrating unstructured application usage traces." In Proceedings of the 26th International Conference on World Wide Web Companion, pp. 485-493. International World Wide Web Conferences Steering Committee, 2017.

(Continued)

*Primary Examiner* — Kostas J Katsikis

(74) *Attorney, Agent, or Firm* — Shook, Hardy & Bacon LLP

(57) ABSTRACT

Methods and systems are provided for generating interpretable user modeling system. The interpretable user modeling system can use an intent neural network to implement one or more tasks. The intent neural network can bridge a semantic gap between log data and human language by leveraging tutorial data to understand user logs in a semantically meaningful way. A memory unit of the intent neural network can capture information from the tutorial data. Such a memory unit can be queried to identify human readable sentences related to actions received by the intent neural network. The human readable sentences can be used to interpret the user log data in a semantically meaningful way.

20 Claims, 12 Drawing Sheets

(56) References Cited

U.S. PATENT DOCUMENTS

| | | | | |
|---|---|---|---|---|
| 10,470,510 | B1 * | 11/2019 | Koh | G06T 7/11 |
| 10,510,002 | B1 * | 12/2019 | Olabiyi | G06N 7/005 |
| 10,692,019 | B2 * | 6/2020 | Goodsitt | G06N 3/0472 |
| 2010/0088262 | A1 * | 4/2010 | Visel | G06N 3/02<br>706/18 |
| 2015/0007065 | A1 * | 1/2015 | Krishnamoorthy | G06Q 30/0202<br>715/760 |
| 2017/0032273 | A1 * | 2/2017 | Ho | G06N 5/04 |
| 2017/0293675 | A1 * | 10/2017 | York | G06F 16/24578 |
| 2018/0053093 | A1 * | 2/2018 | Olabiyi | B60W 40/09 |
| 2018/0063265 | A1 * | 3/2018 | Crossley | H04L 67/22 |
| 2018/0075146 | A1 * | 3/2018 | Petrescu | G06F 16/9535 |
| 2018/0218087 | A1 * | 8/2018 | Rapaka | H04L 67/306 |
| 2018/0336450 | A1 * | 11/2018 | Gramuglio | G06N 20/00 |
| 2018/0357321 | A1 * | 12/2018 | Cheng | G06Q 30/0643 |
| 2019/0018675 | A1 * | 1/2019 | Ang | G06F 16/903 |
| 2019/0028492 | A1 * | 1/2019 | Coleman | G06F 3/0481 |
| 2019/0171428 | A1 * | 6/2019 | Patton | G06N 20/00 |
| 2020/0035222 | A1 * | 1/2020 | Sypniewski | G10L 25/18 |
| 2020/0075040 | A1 * | 3/2020 | Provost | G06N 3/08 |
| 2020/0097495 | A1 * | 3/2020 | Gupta | G06F 16/3325 |
| 2020/0111019 | A1 * | 4/2020 | Goodsitt | G06N 20/10 |
| 2020/0117711 | A1 * | 4/2020 | Fleischman | G06F 40/30 |
| 2020/0133662 | A1 * | 4/2020 | Smith | G06N 3/0445 |
| 2020/0160384 | A1 * | 5/2020 | Duncan | H04L 67/22 |
| 2020/0184307 | A1 * | 6/2020 | Lipka | G06N 3/088 |
| 2020/0193297 | A1 * | 6/2020 | Verhoef | G06F 17/18 |
| 2020/0202735 | A1 * | 6/2020 | Santos-Sheehan | G09B 5/065 |
| 2020/0202848 | A1 * | 6/2020 | Santos-Sheehan | G06F 3/167 |
| 2020/0251096 | A1 * | 8/2020 | Audhkhasi | G10L 15/16 |
| 2020/0272944 | A1 * | 8/2020 | Goodsitt | G06N 20/00 |

OTHER PUBLICATIONS

Kiros, Ryan, Yukun Zhu, Ruslan R. Salakhutdinov, Richard Zemel, Raquel Urtasun, Antonio Torralba, and Sanja Fidler. "Skip-thought vectors." In Advances in neural information processing systems, pp. 3294-3302. 2015.

Sukhbaatar, Sainbayar, Jason Weston, and Rob Fergus. "End-to-end memory networks." In Advances in neural information processing systems, pp. 2440-2448. 2015.

* cited by examiner

| Action sequence | Interpretation by attended memory slots (annotations) |
|---|---|
| [open] | Step 33 Open the tourist photo. |
| [crop_tool] | You can fine-tune your crop with the arrow keys. |
| [layer_via_copy] | (Layer>Layer via Copy). |
| [new_curves_layer] | Go to Layer > New Adjustment > Curves and add Curves adjustment layer. |
| [new_levels_layer] | Add a Black and White adjustment layer, then add a Levels adjustment layer. |
| [zoom_in_tool] | Click repeatedly to zoom in closer. |

FIG. 10A

| Action sequence | Interpretation by attended memory slots (annotations) |
|---|---|
| [open] | Open your Tractor Image. |
| [rectangular_marquee] | With the Rectangular Marquee Tool (M) create a rectangular selection like the image below. |
| [rectangular_marquee_tool] | To do that, activate the Rectangular Marquee tool (M) and then select the rope of our swing. |
| [paste] | Press CTRL + V to paste in your texture. |
| [eraser] | Use the Eraser Tool (E) at any point to remove any harsh edges. |
| [brush_tool] | With a large, soft brush paint black on the bottom, and corners of the rectangle and white in the middle. |
| [eraser] | Use the Eraser Tool (E) to erase any blurred edges to bring back some sharpness around the face and body. |
| [brush_tool] | Choose a Soft Round brush at 40-80% Opacity. |
| [move] | Pick the Move Tool ( V ) and Control-click the part you want to color. |

FIG. 10B

| | Top1 | Top2 | Top3 | Top4 | Top5 |
|---|---|---|---|---|---|
| Log2Intent | Photography | Digital Photography | Fine Arts | Graphic Design | Performing Arts |
| User interests (Ground truth) | **Fine Arts, Photography, Digital Photography** | | | | |

1102

INTERPRETABLE USER MODELING FROM UNSTRUCTURED USER DATA

BACKGROUND

Oftentimes, it is desirable to perform user modeling (e.g., modeling user behavior) related to software and/or web services. For instance, user modeling can be used to determine and/or analyze user behavior related to a specific software program. User modeling can enable personalization of such software and/or web services. Traditional user modeling approaches typically use structured user data to understand user behavior. Structured user behavior data can include, for example, texts, images, ratings, etc. However, user modeling is difficult to perform using unstructured user behavior data. Such unstructured user behavior data can be, for example, user log-trace data that does not have a pre-defined model and/or is not organized in a pre-defined manner.

User modeling of unstructured user behavior data has been attempted. However, conventional methods for user modeling of unstructured user data are limited in success. For instance, user modeling of unstructured user data raises many challenges. These challenges include, for instance, the large semantic gap between unstructured user data and human readable language. This gap creates difficulties in interpreting the unstructured user data in an understandable way. Further, conventional methods of user modeling of unstructured user data do not account for temporal context in the unstructured user data. Without accounting for temporal context, important aspects of user behavior can be lost. As such, conventional methods fail to present user modeling of unstructured user behavior data in a manner that can be used to easily interpret the user data (e.g., to understand user behavior).

SUMMARY

Embodiments of the present disclosure are directed to an interpretable user modeling system capable of interpreting unstructured user data in a human understandable manner. Advantageously, the interpretable user modeling system can provide insight into user behavior using a human readable text. Such human readable text can provide insight into various user behavior based on user interactions with a software program. One method described herein for creating such a system is using a recurrent neural network(s). An intent neural network (e.g., a recurrent neural network) can be trained to bridge the semantic gap between unstructured user data and human language by leveraging auxiliary text-based data to interpret the unstructured user data in a semantically meaningful way. In embodiments, the intent neural network can receive and interpret unstructured user data (e.g., user log data). For example, the intent neural network can interpret user log data into one or more interpretable human readable sentences that indicate user behavior with a software program. The intent neural network can also incorporate a semantics memory unit into its sequence-to-sequence learning. In particular, a semantics memory unit can be used to identify the one or more interpretable human readable sentences related to actions (e.g., identified from the user log data) performed using a software program. In instances, such a semantics memory unit can be created using tutorial data (e.g., human annotations for action sequences performed in a software program).

BRIEF DESCRIPTION OF THE DRAWINGS

FIGS. 10A and 10B illustrate examples of outputs related to performing the task of log interpretation using intent neural network of an interpretable user modeling system, in accordance with embodiments of the present disclosure.

DETAILED DESCRIPTION

Figure 1A:
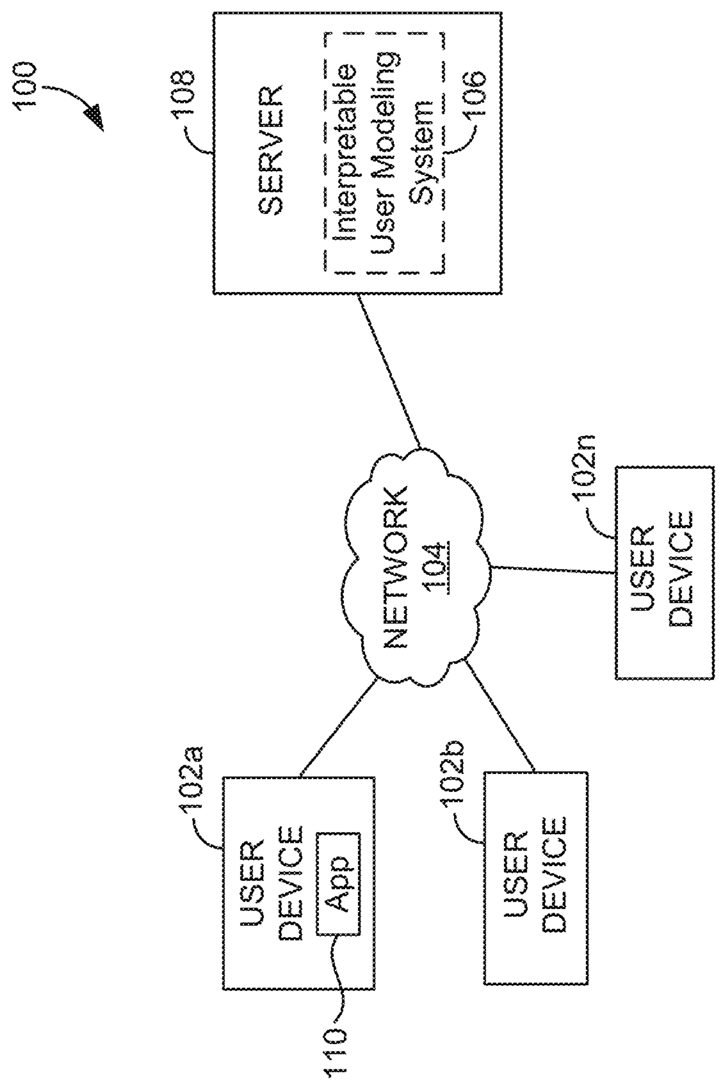
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

User modeling can enable personalization of software and/or web services. For instance, such personalization can be applied in recommendation systems, personalized social web, online advertising, email marketing, intelligent user interfaces, and so on. Many conventional user modeling approaches typically are based on structured user behavior data (e.g., texts, images, ratings, etc.). However, user modeling has been difficult to perform using unstructured user behavior data. Such unstructured user behavior data can be, for example, software log data (e.g., log-trace data). Software log data can be obtained from many complex software programs. For instance, log data can be based on recorded user actions (e.g., related to usage of an application). In this way, user log data can indicate a sequence of user actions based on user interactions with a software program. Such software programs that collect user log data are often complex software programs such as image editing software (e.g., Photoshop), computer-aided design and manufacturing software (e.g., CAD/CAM), enterprise resource planning software (e.g., SAP, ERP).

User log data related to a complex software program can be information that provides insight into a user (e.g., user behavior). Oftentimes, such information can provide insight into a user because user log data is collected as a user interacts with a software program in relation to the user's daily life (e.g., a graphic designer interacting with Photoshop). In this way, user log data can be useful for enriching a user's profile and/or describing behavior of the user if the user log data can be interpreted in an understandable way.

Conventional methods of user modeling of unstructured user data have been limited in success. Conventional approaches can extract discriminative embeddings from user log data. However, such approaches neglect to model long-term temporal context between user logs, losing valuable information related to how the user log data relates to each other in a sequence. Further, the large semantic gap between unstructured user log data and human readable language often means that any modeling of the user log data does not result in an easily understandable output. As such, conventional methods fail to present user modeling of unstructured user log data in a manner that can be used to easily understand and interpret the user log data (e.g., to understand user behavior).

Accordingly, embodiments of the present disclosure are directed to facilitating the creation and utilization of an interpretable user modeling system. Advantageously, the interpretable user modeling system is capable of interpreting unstructured user data (e.g., user log data) in a human readable manner. The interpretable user modeling system can provide insight based on how a user interacts with a software program. In some instances, the interpretable user modeling system can be used to provide human readable annotations to interpret actions of a user interacting with a software program (e.g., based on user log data). In other instances, the interpretable user modeling system can be used to interpret user log data by providing predictions of what action(s) a user may take in the software program. Such predicted actions can be described using human readable annotations related to the predicted actions. In other instances, the interpretable user modeling system can be used to provide insight by interpreting user log data to predict potential user interest related to the software program. The potential user interest can be described using human readable text indicative of user interest (e.g., occupation, self-disclosed tags, etc.). At a high-level, the interpretable user modeling system bridges the semantic gap between log data and human language by leveraging auxiliary human-readable text data to interpret user log data in a semantically meaningful way. Such an interpretable user modeling system can be used to understand user intent and predict user behavior from such log data. For example, in some embodiments, the interpretable user modeling system can be used to interpret user log data in a human readable manner. In other embodiments, the interpretable user modeling system can be used to learn a compact user representation (e.g., predict user interest) from log history of a user. In yet other embodiments, the interpretable user modeling system can be used to predict a next user action using previous user actions.

The interpretable user modeling system can be implemented using one or more neural networks (e.g., a recurrent neural network). A neural network generally refers to a computational approach using large clusters of connected neurons. Neural networks are self-learning and trained rather than explicitly programmed such that a generated output of a neural network reflects a desired result. As described herein, the interpretable user modeling system can utilize an intent neural network (e.g., a log2intent neural network). In instances, the intent neural network can be a recurrent neural network. Such an interpretable user modeling system can apply the intent neural network to learn better embeddings for user log data. As such, the intent neural network can be trained to be capable of indicating an interpretable meaning of the embedding. In embodiments, output from the intent neural network can be easily interpreted to provide insight into user log data.

In an embodiment, the intent neural network (e.g., implemented using intent model engine 210) can use a modified encoder-decoder architecture. The intent neural network can bridge a semantic gap between log data and human language by leveraging tutorial data to understand user logs in a semantically meaningful way. In implementations, the intent neural network can incorporate a memory unit (e.g., a recurrent semantics memory unit) into sequence-to-sequence learning. Such a memory unit of the intent neural network can capture semantic information from the tutorial data. The memory unit can be queried to identify human readable sentences related to actions (e.g., from user log data) received by the intent neural network. The human readable sentences can be used to interpret the user log data in a semantically meaningful way.

To train the intent neural network, the modified encoder-decoder architecture can be employed. A temporal encoder can model contextual information between a sequence of user log data (e.g., comprised of actions). The temporal encoder can generate a hidden state that models such contextual information. The memory unit, as discussed above, can capture information from tutorial data. A semantic encoder can fuse the output of the memory unit with the hidden state generated by the temporal encoder. The log action decoder can be fed with the combined output from the temporal and semantic encoders such that a previous action can be used to predict a next action based on the sequence of user log data conditioned on the last hidden state.

When implementing the intent neural network, a session can be received. The session (e.g., of user log data) can contain a set of actions indicative of use of a software program by a user. The temporal encoder of the intent neural network can generate hidden representations for the actions of the session. The entire session can then be represented using, for example, a last hidden state (e.g., a combination of the hidden representations).

The semantic encoder can receive the actions of the session along with the hidden representations. Such information can be used to build connections between recurrent semantic memory units (e.g., representing sentences from tutorial data) and the actions to focus modeling on the relationship between user actions and sentences from the tutorial data. Such a tutorial dataset can be comprised of human annotations for action sequences in tutorials related to a software program. For instance, a tutorial can be step-by-step instructions of how to perform a task in the software program (e.g., what actions to perform). Queries can be generated for actions of the session. A query can include a hidden representation of an action and the action. In embodiments, the query can be used in relation to the memory unit (e.g., containing sentences from the tutorial dataset). In particular, in embodiments, using the memory unit, the query can be used to compute attention weights between the query and the sentences (e.g., indicating how similar and/or related the query and a sentence are). A semantic context vector can be generated that indicates the attention weights for the sentences in the memory unit.

A session vector for the session can be generated by combining the last hidden state of an action sequence (e.g., from the temporal encoder) and the semantic context vector (e.g., from the semantic encoder using the memory unit) related to all the attended sentences. In this way, the session vector can include both temporal context and semantic information.

The intent neural network can be used to implement one or more tasks. A task can relate to using the output of the trained intent neural network for a particular application (e.g., predicting a user action with a software program, predicting user interest based on how a user interacts with a software program, providing human readable annotations to describe actions of a user with a software program). In embodiments, a log action decoder of the intent neural network can output (e.g., predict) an action based on a session vector conditioned on a previous session vector obtained from a previous session. For example, from a sequence of actions (e.g., of the session), the intent neural network can predict a next action for the sequence. In other embodiments, the intent neural network can operate in conjunction with a trained linear classifier to output one or more project tags related to a user (e.g., indicating a predicted user interest). In further embodiments, the intent neural network can output one or more log annotations for actions of a user.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 12.

It should be understood that operating environment 100 shown in FIG. 1A is an example of one suitable operating environment. Among other components not shown, operating environment 100 includes a number of user devices, such as user devices 102*a* and 102*b* through 102*n*, network 104, and server(s) 108. Each of the components shown in FIG. 1A may be implemented via any type of computing device, such as one or more of computing device 1200 described in connection to FIG. 12, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102*a* through 102*n* can be any type of computing device capable of being operated by a user. For example, in some implementations, user devices 102*a* through 102*n* are the type of computing device described in relation to FIG. 12. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) 110 may generally be any application capable of facilitating the exchange of information between the user devices and the server(s) 108 for use in carrying out a software program. In instances, the application can relate to interpretable user modeling for the software program. For instance, the application(s) can be related to image editing software (e.g., Photoshop), computer-aided design and manufacturing software (e.g., CAD/CAM), enterprise resource planning software (e.g., SAP, ERP), etc. In some implementations, the application(s) comprises a web application, which can run in a web browser, and could be hosted at least partially on the server-side of environment 100. In addition, or instead, the application(s) can comprise a dedicated application, such as an application for running a software program. In some cases, the application is integrated into the operating system (e.g., as a service). It is therefore contemplated herein that "application" be interpreted broadly.

In accordance with embodiments herein, the application 110 can be related to any software program that allows for the collection of user log data and has related tutorial information. The user log data can contain information related to interactions by a user with a software program. The tutorial dataset can include annotations for an action sequence in all the tutorials. For instance, the annotations can be human readable sentences that describe user actions with the software program. For an action sequence, the annotations can describe step-by-step instructions of how to perform a task in the software program (e.g., what actions to perform). Interpretable user modeling can bridge the semantic gap between user log data and human readable language by leveraging tutorial data related to a software application. In this way, in instances, application 110 can be used in interpreting user log data in a semantically meaningful way.

As described herein, server 108 can facilitate interpretable user modeling related to a software program (e.g., of application 110) via interpretable user modeling system 106. Server 108 includes one or more processors, and one or more computer-readable media. The computer-readable media includes computer-readable instructions executable by the one or more processors. The instructions may optionally implement one or more components of interpretable user modeling system 106, described in additional detail below.

Interpretable user modeling system 106 can train and operate a neural network system in order to perform interpretable user modeling. Such a neural network system can be comprised of one or more neural networks that are trained to generate a designated output. For example, a neural network system can utilize a modified encoder-decoder framework. The interpretable user modeling system is discussed in further detail with reference to FIG. 2.

In implementations (e.g., cloud-based implementations), the instructions on server 108 may implement one or more components of interpretable user modeling system 106, and application 110 may be utilized by a user to interface with the functionality implemented on server(s) 108. In some cases, application 110 comprises a web browser. In other cases, server 108 may not be required. For example, the components of interpretable user modeling system 106 may be implemented completely on a user device, such as user device 102*a*. In this case, interpretable user modeling system 106 may be embodied at least partially by the instructions corresponding to application 110.

Thus, it should be appreciated that interpretable user modeling system 106 may be provided via multiple devices arranged in a distributed environment that collectively provide the functionality described herein. Additionally, other components not shown may also be included within the distributed environment. In addition, or instead, interpretable user modeling system 106 can be integrated, at least partially, into a user device, such as user device 102*a*. Furthermore, interpretable user modeling system 106 may at least partially be embodied as a cloud computing service.

Figure 1B:
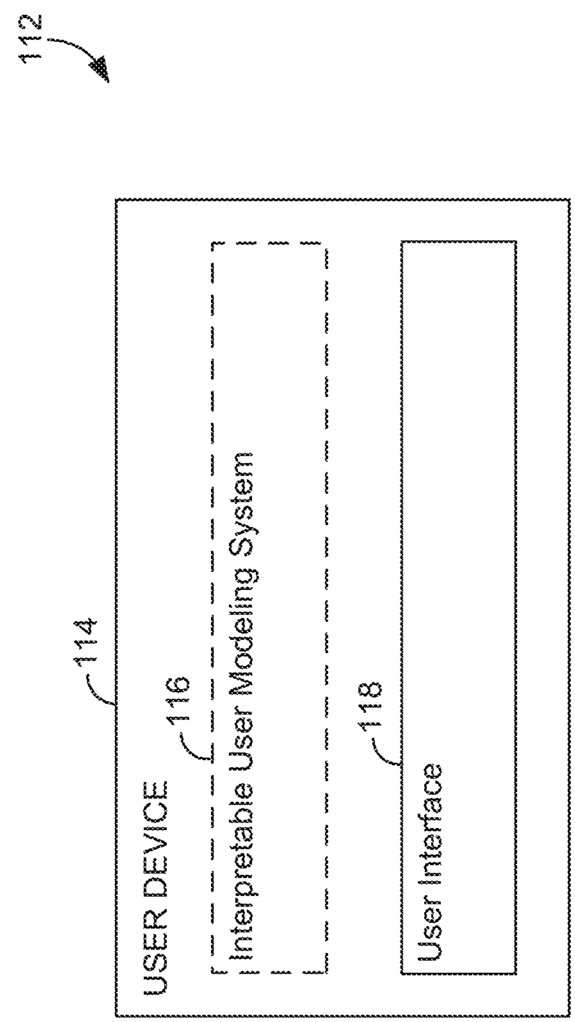
FIG. 1B depicts an example configuration of an operating environment in which some implementations of the present disclosure can be employed, in accordance with various embodiments.

Referring to FIG. 1B, aspects of an illustrative interpretable user modeling system is shown, in accordance with various embodiments of the present disclosure. FIG. 1B depicts a user device 114, in accordance with an example embodiment, configured to allow for perform interpretable user modeling related to a software program. The user device 114 may be the same or similar to the user device 102*a*-102*n* and may be configured to support the speech recognition system 116 (as a standalone or networked device). For example, the user device 114 may store and execute software/instructions to facilitate interactions between a user and the interpretable user modeling system 116 via the user interface 118 of the user device.

A user device can be utilized by a user to facilitate performance of interpretable user modeling. In particular, a user indicate a set of a user log data for interpretation using the interpretable user modeling system 116. User log data can be input into the interpretable user modeling system in any manner. The processed result of the user log data can be presented utilizing user interface 118. The processed result can be related to one or more of user action prediction, user interest prediction, and/or log interpretation. Based on user log data, interpretable user modeling system 116 can be used to perform one or more tasks using various techniques, some of which are further discussed below.

Figure 2:
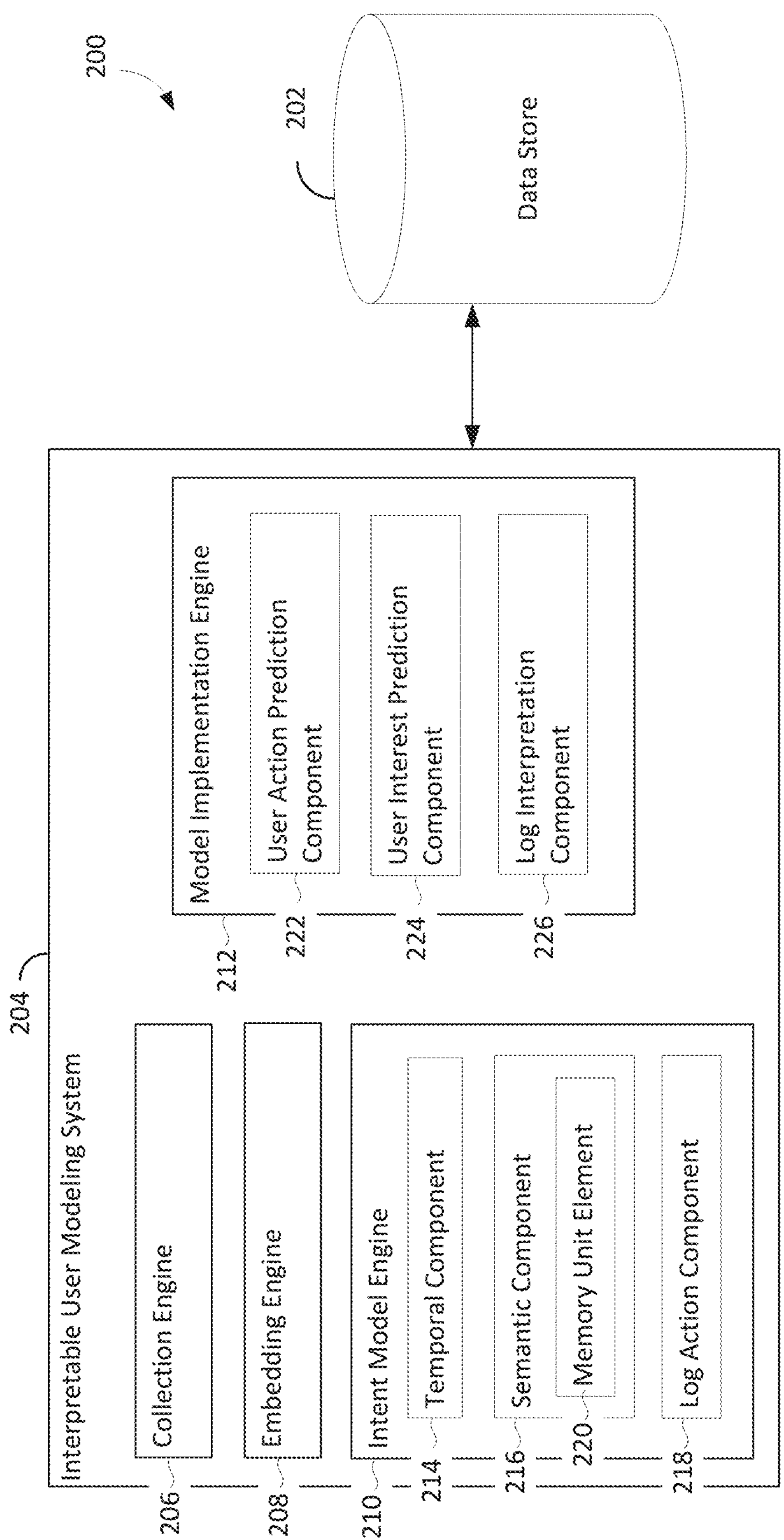
FIG. 2 depicts an example configuration of an operating environment in which some implementations of the present disclosure can be employed, in accordance with various embodiments of the present disclosure.

Referring to FIG. 2, aspects of an illustrative environment 200 are shown, in accordance with various embodiments of the present disclosure. As depicted, interpretable user modeling system 204 may include collection engine 206, embedding engine 208, intent model engine 210, and model implementation engine 212. The foregoing engines of interpretable user modeling system 204 can be implemented, for example, in operating environment 100 of FIG. 1A and/or operating environment 112 of FIG. 1B. In particular, those engines may be integrated into any suitable combination of user devices 102*a* and 102*b* through 102*n* and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the interpretable user modeling system.

Interpretable user modeling system 204 can generally be implemented as a framework for modeling user behavior in an interpretable manner. Modeling and understanding user behavior can allow for providing personalized services. In embodiments, user behavior can be modeled using unstructured software log data. Log data can be recorded to reflect user actions (e.g., related to usage of an application). For instance, user log data can indicate a sequence of user actions as a user interacts with an application. In this way, software log data can provide large amounts of information about a user. Oftentimes, such information is personalized to the user because the information can be collected as a user interacts with a software program day to day (e.g., a graphic designer interacting with Photoshop). Such information can be useful in enriching user profiles and/or describing user behavior. For example, interpretable user modeling system 204 can be used to understand user intent from such log data. In particular, in some embodiments, the interpretable user modeling system can be used to interpret user log data in a human readable manner. In further embodiments, the interpretable user modeling system can be used to learn a compact user representation such as user occupation, self-disclosed tags, etc. (e.g., predict user interest) from a log data history of a user. In other embodiments, the interpretable user modeling system can be used to predict a next user action based on previous user actions.

In accordance with embodiments described herein, the interpretable user modeling system can be implemented using, for example, an intent neural network. Specifically, the interpretable user modeling system can be used to train an intent neural network and/or utilize a trained intent neural network to implement one or more tasks (e.g., interpret output from the intent neural network to provide insight into user behavior based on user log data). Intent model engine 210 can be used to train an intent neural network (e.g., a log2intent model engine can train a log2intent neural network). In embodiments, intent model engine 210 can access one or more datasets for use in training. Such datasets can be stored, for example, in data store 202. Model implementation engine 212 can be used to implement the intent neural network to perform one or more tasks using output from the intent neural network (e.g., user action prediction, user interest prediction, log interpretation). In embodiments, during training, intent model engine 210 and model implementation engine 212 can operate in conjunction with each other to train the intent neural network to perform a specific task.

As shown, an interpretable user modeling system can operate in conjunction with data store 202. Data store 202 can store computer instructions (e.g., software program instructions, routines, or services), data, and/or models used in embodiments described herein. In some implementations, data store 202 can store information or data received via the various engines and/or components of interpretable user modeling system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 can include training data. Training data generally refers to data used to train a neural network, or portion thereof. As such, training data can include one or more datasets (e.g., a user log dataset and a tutorial dataset). For instance, the user log dataset can comprise user log data. User log data can contain sessions from user set (e.g., {u}). Such user log data can be used to provide pairs of sessions, such as, $(s^i, s^{i+1})$ to the neural network to model temporal patterns for each user. The tutorial dataset can include human readable annotations for action sequences in the tutorials. Further, the action sequences and human readable annotations from the tutorial dataset can be used to supervise the recurrent semantics units of a memory unit (e.g., related to the semantic encoder) such that a memory slot (e.g., tutorial sentence) corresponds to an action based on temporal context.

Datasets (e.g., a user log dataset and a tutorial dataset) can be used for training a neural network (e.g., an intent neural network). The datasets can be input into data store 202 from a remote device, such as from a server or a user device. These datasets can be stored in a raw form and/or in a processed form. In embodiments, the user log dataset and/or the tutorial dataset can undergo pre-processing. For instance, processing the user log dataset can include dividing user sessions based on a maximum time step (e.g., such that user sessions do not exceed the maximum time step). A time step can indicate a number of actions from user log data (e.g., 30 or 100). Processing the user log dataset can also include removing sessions that are smaller than the maximum time step. Such a processed user log dataset can be stored as user sessions in data store 202. Further, in instances, processing the tutorial dataset can include filtering out low frequency words from tutorial data. Filtering the tutorial dataset can reduce the “vocabulary” of the tutorial dataset to commonly used words (e.g., as related to actions). Such sentences of a tutorial dataset can be linked to user actions with a software program from, for example, the user log dataset. Processing of the user log dataset and/or the tutorial dataset is further discussed with reference to collection engine 206 and/or embedding engine 208.

Data store 202 can also be used to store a neural network during training and/or upon completion of training. Such a neural network can be comprised of one or more neural networks and/or neural network systems. For example, the neural network can include an intent neural network.

Collection engine 206 can be used to collect and/or process collected data. Such data can include user log data and/or tutorial data. User log data can contain sessions from user set (e.g., {u}) of users interacting with (e.g., using) a software program. For instance, a session can contain a set of actions indicative of use of the software program by a user. The tutorial dataset can include human readable annotations describing action sequences in tutorials related to a software program. For instance, a tutorial can be step-by-step instructions of how to perform a task in the software program (e.g., what actions to perform).

In embodiments, user log data can be collected on a per session basis. In some embodiments, a session can be designated based on user activity per time unit (e.g., user actions occurring within a predefined time window—5, minutes, 10 minutes, 15 minutes). In other embodiments, session can be designated as an uninterrupted use of a software program. In further embodiments, sessions can be designated using a maximum time step of actions (e.g., T). Using a maximum time step can result in sequences of actions with variable lengths being used in training. In this way, the variable sequences can be set to not exceed the maximum time step T During pre-processing, the collection engine can divide user sessions with a size larger than the maximum time step into consecutive sub-sessions. For example, unprocessed user sessions can have an average length of 220 actions. Dividing user sessions can be performed using, for instance, a non-overlapping sliding window of size T. As an example, if T is set to 30, an unprocessed user session with 150 actions can be divided into five sessions with 30 actions. As another example, if T is set to 100, an unprocessed user session with 150 actions can be divided into two sessions (e.g., one session with 100 actions and one session with 50 actions; two sessions with 75 actions; etc.). Further, in some embodiments, during pre-processing, if a user has a single session that is smaller than T, that session can be removed (e.g., not added to the user log dataset of sessions). In this way, a user log dataset comprised of sessions can be generated. The sessions of the user log dataset can belong to various users based on the T time step. In instances, a threshold level of within T can be used (e.g., plus or minus two seconds). In embodiments, time step T can be varied. For instance, T can be set to 30 in some embodiments. In other instances, T can be set to 100 in some embodiments. In such a user log dataset of time step based sessions, a percentage of the sessions can be used for training and the remaining sessions used for evaluations (e.g., 90% used in training and 10% used for validation).

Further, collection engine 206 can process the user actions (e.g., based on user log data related to a software program). For example, the user actions can be filtered to determine a set of actions for use in training. In particular, user logs related to a software program can share a common “vocabulary” of unique actions. For instance, tasks that may be performed within a software program may be comprised of a set of actions (e.g., the “vocabulary”). In some embodiments, the user actions can undergo processing. In particular, in embodiments, low frequency actions can be filtered out of the user actions. In this way, the user actions used during training can be commonly implemented actions related to a software program.

In some embodiments, software log data can be analyzed by the interpretable user modeling system to provide insight into user behavior. For instance, {u} can be denoted as a set of users, where each user can have a long log history consisting of a sequence of sessions (e.g., $u \rightarrow [s^1, s^2, \ldots, s^N]$). In embodiments, $s^i$ can represent the i-th session and N can denote the number of user sessions. For instance, a user session can be a sequence of data denoted as $s^1=[a_1^i, a_2^i, \ldots a_T^i]$, where $a_T^i$ can represent the t-th software action taken by user u in the i-th session. Further, T can be the length of $s^i$, and $V_a$, can be the vocabulary for the unique software actions (e.g., from the log data).

Tutorial data can be obtained from tutorials related to a software application. Such tutorials can be an official tutorial (e.g., provided by the company that owns the software application) or independently generated tutorials. A tutorial dataset can be created by preprocessing such tutorials. For instance, the tutorials can be preprocessed using the "vocabulary" (e.g., the vocabulary identified for the user log data). Such a vocabulary can be applied to tutorial data to identify actions within the tutorials. An action can be well aligned with user actions performed within a software program (e.g., actions that are preformed to accomplish a task within the software program). Such actions can correspond with at least one annotation per tutorial (e.g., the annotation in a human readable language). An action can be annotated with different annotations based on context of the action (e.g., what task is being performed, the surrounding actions). In this way, context can play a role in associating an action with a corresponding annotation.

In embodiments, the collection engine can pre-process the tutorial dataset by filtering out low-frequency words. Filtering the tutorial dataset can reduce the "vocabulary" of the tutorial dataset to commonly used words (e.g., as related to actions). Such sentences of a tutorial dataset can be linked to actions from, for example, the user log dataset. In embodiments, each tutorial can use a slide window with a size of ten with one step forward increments. This can result in consecutive action sequences with ground-truth annotation sentences. In such a tutorial dataset, a percentage of the tutorial sequences can be used for training and the remaining tutorial sequences used for evaluations (e.g., 95% used in training and 5% used for validation).

As an example, in an embodiment, data related to Photoshop can be used to train the intent neural network. Photoshop can provide log data related to users performing complex and long-period tasks (e.g., comprised of long action sequences). Such long-period tasks can provide temporal context to how actions relate to one another in a sequence (and correspond to user behavior). In addition, there are many tutorials available related to Photoshop that can be used to obtain text annotations (e.g., explanations) for an action sequence that comprises a task. Further, Photoshop users cover a wide range of occupations (e.g., graphic designer, advertiser, artist), each of which have different user interests and professional habits. In particular, when using Photoshop to train the intent neural network, to obtain user log data, the Photoshop software can record actions conducted in the application. As an example, user actions within Photoshop can include buttons clicked, tools selected, features applied (e.g., [open], [undo], [move], [horizontal_type_tool], [brush_tool], [stamp_pickup_tool], [deselect], [clone_stamp], [stepbackward]).

Embedding engine 208 can be used to convert data (e.g., user log data and/or tutorial data) into vector form. Neural networks typically process data in vector form more effectively than raw data. In embodiments, the interpretable user modeling system can convert data into vector for utilizing embedding layers to project discrete variables into continuous vector space (e.g., for input into the intent neural network). For example, an embedding matrix (e.g., a look-up table) can be used to index input variables. In some embodiments, $A \in \mathbb{R}^{|V_a| \times d_a}$ can be an embedding matrix for actions. An action (e.g., $a_t$) can be represented by $x_t = A(a_t)$. In instances, $d_a$ can represent a dimension for the action embedding, $1 \le a_t \le |V_a|$, that indexes the $a_t$-th row in matrix A. Memory slots (e.g., where each slot can indicate a tutorial sentence) can also be vectorized in matrix M. For instance, a memory look-up table can be defined for addressing memories. In particular, $M \in \mathbb{R}^{|V_w| \times d_m}$ can designate a memory look-up table for addressing memories. Further, a memory look-up table can be defined for reading memories. In particular, matrix O (e.g., $O \in \mathbb{R}^{|V_w| \times d_m}$ can designate a memory look-up table for addressing memories. In such memory look-up tables, $d_m$ can refer to the embedding dimension for the memories. In this way, a memory slot $m_k$ can be represented by the following equations that give memory embeddings as a weighted sum of word embeddings within a sequence $m_k$, $1 \le k \le L$:

$$m_k = \sum_l \eta(l) M(w_l^k)$$

$$o_k = \sum_l \eta(l) O(w_l^k)$$

In such equations, $1 \le l \le L$ can index the l-th word in $m_k$ and $\eta(l)$ is a weight function w.r.t. the word position in one sentence.

An embedding size can be set for action embedding matrix A and memory embedding matrices M and O (e.g., $d_a, d_m = 100$). Matrix A can be trained to convert words (e.g., user actions) to vectors from user log data. In embodiments, a word2vec model can be used for matrix A (e.g., converting a word into vector form). After training of matrix A, matrix A can be fixed during training of the intent neural network (e.g., such that weights/parameters of A are not updated during training). Fixing matrix A during the training of the intent neural network can prevent overfitting. Matrices M and O can be initialized using Glove word embeddings and then fine-tuned during training of the intent neural network.

In embodiments, the intent model engine 210 can generally be used to train the intent neural network of the interpretable user modeling system. As depicted, intent model engine 210 may include temporal component 214, semantic component 216, and log action component 218. The foregoing components of intent model engine 210 can be implemented, for example, in operating environment 100 of FIG. 1A and/or operating environment 112 of FIG. 1B. In particular, these components may be integrated into any suitable combination of user devices 102*a* and 102*b* through 102*n* and server(s) 106 and/or user device 114. While the various components are depicted as separate components, it should be appreciated that a single component can perform the functionality of all components. Additionally, in implementations, the functionality of the components can be performed using additional components and/or engines.

Further, it should be appreciated that the functionality of the components can be provided by an engine separate from the intent model engine.

The intent neural network can comprise a plurality of interconnected nodes with a parameter, or weight, associated with each node. Each node can receive inputs from multiple other nodes and can activate based on the combination of all these inputs, for example, when the sum of the input signals is above a threshold. The parameter can amplify or dampen the input signals. For example, a parameter could be a value between 0 and 1. The inputs from each node can be weighted by a parameter, or in other words, multiplied by the parameter, prior to being summed. In this way, the parameters can control the strength of the connection between each node and the subsequent node. For example, for a given node, a first parameter can provide more weight to an input from a first node, while a second parameter can provide less weight to an input from a second node. As a result, the parameters strengthen the connection to the first node, making it more likely that a signal from the first node will cause the given node to activate, while it becomes less likely that inputs from the second node will cause activation. These parameters can be determined during training of the intent neural network, as discussed below.

In an embodiment, the intent neural network (e.g., implemented using intent model engine) can use a modified encoder-decoder architecture. In implementations, the intent neural network can incorporate a memory unit into sequence-to-sequence learning. In particular, the intent neural network can have a temporal encoder, a semantic encoder, and a log action decoder. In embodiments, the semantic encoder can further include a recurrent semantics memory unit.

To train the intent neural network, a modified encoder-decoder architecture as discussed above can be employed. The temporal encoder can model contextual information between action sequences from a session of user log data. The recurrent semantics memory unit can capture information from tutorial data. The semantic encoder can fuse the memory output of the recurrent semantics memory unit and the hidden state of the temporal encoder. The log action decoder can be fed with a previous action to predict the next action conditioned on the last hidden state. In this way, the intent neural network can capture long-term temporal information and generate interpretable results (e.g., using a memory unit to exploit an auxiliary tutorial data). In particular, the intent neural network can capture temporal information from a user session. In this way, the intent neural network can be trained to interpret user behavior from any software program that can provide user log data and has associated data (e.g., text tutorials).

The intent neural network can learn action and memory embeddings to enable gradient back-propagation for network training. User log data can be viewed as sequential data that contains temporal context that varies from task to task and reflects user habits at the same time. As such, it can be advantageous to capture temporal information from each user session. In this way, the intent neural network leverages a session-to-session strategy as $s^i \rightarrow s^{i+1}$. The modified encoder-decoder framework can be used to model user behaviors.

Temporal component 214 can be used to model contextual information between log action sequences. For instance, context information can indicate how actions relate to one another in a sequence (and correspond to user behavior). In embodiments, the temporal component can be used to run the temporal encoder. Such a temporal encoder, $f_{enc\text{-}T}$ can be represented in embodiments as:

$$h_t = f_{enc\text{-}T}(x_t, h_{t-1}; \theta_{enc\text{-}T})$$

In such an equation, $x_t$ can be the action embedding for $a_t \in s$. $\theta_{enc\text{-}T}$ can refer to the learnable parameters for the temporal encoder, $f_{enc\text{-}T}$. Using such a temporal encoder, a hidden representation, $h_t$, can be generated for each time step with new arrival action and previous state. In this way, an entire session, s, can be represented by a last hidden state hr. In embodiments, the temporal encoder can be implemented using a recurrent neural network. In instances, a Long Short-Term Memory can be used. In other instances, a Gated Recurrent Unit can be used.

In embodiments using a Gated Recurrent Unit, the Gated Recurrent Unit can be defined by example equation:

$$r_t = \sigma(W_r x_t + U_r h_{t-1}),$$

$$z_t = \sigma(W_z x_t + U_z h_{t-1}),$$

$$\hat{h}_t = \tanh(W x_t + U(r_t \odot h_{t-1})),$$

$$h_t = (1 - z_t) \odot h_{t-1} + z_t \odot \bar{h}_t.$$

In such a representation, $r_t$ can represent a reset gate and $z_t$ can represent an update gate. $\odot$ can denote a Hadamard product and $\hat{h}_t$ can be the candidate state proposed at each time step. A final hidden state $h_t$ can be emitted at time t as a linear interpolation between a previous state $h_{t-1}$ and the candidate $\hat{h}_t$.

Another representation of the temporal encoder (e.g., e) can encapsulate temporal information within Vs into a single hidden representation as $h_T = e([x_1, x_2, \ldots, x_T])$. In such an equation, e can be parameterized by $f_{enc\text{-}T}$ and $\theta_{enc\text{-}T}$ such that the encoder can include all parameters related to Gated Recurrent Unit and the action embedding matrix A. In instances, 64 hidden units can be set at the dimension for the Gated Recurrent Units in the encoding pathway.

Semantic component 216 can be used to incorporate semantic information into the sequence-to-sequence learning of the intent neural network. In embodiments, the semantic component can be used to run the semantic encoder. The semantic component can also be used to implement one or more memory units (e.g., based on human readable sentences from tutorial data). To incorporate semantic information, tutorial data can be leveraged to enrich and interpret sequential user log data. As an example, for each user action (i.e., $\forall a \in V_a$), human readable annotations can be collected from software tutorials as semantic memory slots. In this way, each action a can correspond to a memory unit. A memory unit can be denoted as $M = \{m_k\}_{k=1 \ldots K}$. In embodiments, $m_k$ can be a sequence of L words. Such a sequence of L words can be denoted by $[w_1^k, \ldots, w_L^k]$. Further, $V_w$ can be the word vocabulary shared by all memory units.

The intent neural network can jointly utilize two sources of information (e.g., user action sequences from log data—using temporal component 214—and annotated sentences for each action collected from software tutorials—using semantic component 216). To integrate sentence information into the encoding process can be challenging. In particular, sentences cannot be merged as a semantic view for each action. As such, in embodiments, memory unit element 220 can be used to implement a recurrent semantics unit as part of the semantic encoder to dynamically fetch memory slots (e.g., sentences) corresponding to each action.

Memory unit element 220 can be used to implement a recurrent semantics unit. The recurrent semantics unit can be used to carry out two steps, memory addressing and then memory reading. Referring back to the memory unit, matrix M (e.g., comprising a set of sentences collected from human annotations for log sequence in software tutorials), an action context can be taken into account such that an action corresponds to a sentence group such that a difference sentence is used (e.g., memory slot) based on the action context. This can be matched to different hidden states (e.g., $([h_i, \ldots, h_T])$) in the temporal encoding context. In this way, memory units can be recurrently addressed and read.

The recurrent semantics memory unit can be used to connect the temporal encoder and the semantic encoder. At each time step, the memory unit can be queried with a semantic attention mechanism. An example equation for performing this query can be:

$$q_t = [x_t; h_t],\ e_t = W_q^T q_t,$$

$$\alpha_k = \text{softmax}(e_t^T m_k) = \frac{\exp(e_t^T m_k)}{\sum_{k=1}^{K} \exp(e_t^T m_k)},$$

where $q_t$ can be the query vector. $W_q \in \mathbb{R}^{(d_a+d_h)\times d_m}$ can project $q_t$ into the memory embedding space as $e_t$. In embodiments, $m_k$ represents the memory embedding given by $m_k = \Sigma_l \eta(l) M(w_l^k)$, $1 \le k \le K$, with $\alpha_k$ as the attention weight. The action embedding $x_t$ can be added into the query vector. The action embedding can help build a connection between different software actions and words. $h_t$ (e.g., hidden state) can differ for sentences based on temporal context.

After obtaining attention weights (e.g., $\alpha_k$), for all memory slots, the semantic output for the recurrent semantics unit at each time step can be designated using, for example, $$c_t = W_o^T \sum_{k=1}^{K} \alpha_k o_k,$$

where $c_t$ can represent a semantic context vector. $W_a \in \mathbb{R}^{d_h \times |V_a|}$ can be used to align the dimension of memory embeddings and hidden states. In embodiments, different actions (e.g., $a \in V_a$) can each have a different memory unit but all the recurrent semantics units can share the same parameter, denoted as $\theta_{mem} = \{M, O, W_q, W_o\}$.

For instance, $c_t$ can be the output from the recurrent semantics unit for an action, $a_t$. Such a semantic encoder, $f_{enc\text{-}S}$, can be represented in embodiments as:

$$h'_t = f_{enc\text{-}S}(v_t, h'_{t-1}; \theta_{enc\text{-}S})$$

In such an equation, $v_t = c_t + h_t$, $h'_t$ can denote the semantic hidden state at time t. $f_{enc\text{-}S}$ can be formulated by a Gated Recurrent Unit with $\theta_{enc\text{-}S}$ including all the related parameters in the semantic encoding pathway. $f_{enc\text{-}S}$ can be used to build connections between different recurrent semantic memory units along with time steps to focus modeling on the relationship between different user actions memory context. In this way, a semantic representation for session s can be obtained by, for example, $h'_t = e'([v_1, v_2, \ldots, v_T])$. In such an equation, e' can represent the semantic encoder parametrized by $f_{enc\text{-}S}$.

Encoding the temporal context and semantic information inside the action sequence can be represented as a session vector for session $s^i$ as $h^i = g(h_T, h'_T)$. In such an equation, $g(\cdot,\cdot)$ can represent a fusion function such a summation or concatenation. The session vector, $h^i$ can be for session $s^i$, $1 \le i \le N$. The session vector can encapsulate a long-term sequential pattern from user sessions with the assistance of a tutorial explanation. In this way, the system can gain the ability to remember personalized usage habits.

Log action component 218 can be used to implement a log action decoder. The log action decoder can be fed with a previous action to predict the next action conditioned on the last hidden state. In this way, the log action decoder processes the long-term temporal information captured in the intent neural network to output interpretable results. The log action decoder can be developed by maximizing as indicated by example equation, $$p(s^{i+1}) = \prod_{t=1}^{T} p(a_t^{i+1} \mid a_{t-1}^{i+1}, h_{t-1}^{i+1}, h^i)$$

In such an equation, current action (e.g., $a_t^{i+1}$) in a session (e.g., $s^{i+1}$) can be conditioned on a previous action (e.g., $a_{t-1}^{i+1}$) and a previous hidden state (e.g., $h_{t-1}^{i+1}$) as well as a last session vector (e.g., $h^i$). In embodiments, the hidden state in the decoding process can be obtained using example equation, $h_t^{i+1} = f_{dec}(x_t^{i+1}, h_{t-1}^{i+1}; \theta_{dec})$. In such an equation, $f_{dec}$ can be parameterized by a Gated Recurrent Unit and initialized with $h^i$ (e.g., $h_0^{i+1} = h^i$). $\theta_{dec}$ can represent the parameters in the decoding function. A conditional probability can be obtained through adding a projection layer, using, for example, $W_a \in \mathbb{R}^{d_h \times |V_a|}$ on top of $f_{dec}$. Further, a softmax activation function can be utilized. Such a softmax function can be formulated as $\hat{y}_t^{i+1} = \text{softmax}(W_a^T h_t^{i+1})$, where $\hat{y}_t^{i+1} \in \mathbb{R}^{|V_w|}$ can give a probability distribution over $V_w$.

Training the intent neural network can be carried out by intent model engine 210 (e.g., using temporal component 214, semantic component 216, and log action component 218). In embodiments, the intent neural network can be implemented using, for instance, Tensorflow employing an Adam optimizer. A learning rate can be set to 0.001. In embodiments, a number of hidden units can be defined for the Gated Recurrent Units in the encoding pathway (e.g., $d_h$=64). The dimension of the decoder Gated Recurrent Units can be defined using a fusion function (e.g., $g(\cdot,\cdot)$ in $h^i = g(h_T, h'_T)$). In some embodiments, for instance, when employing summation in the decoder, the dimension of the decoder Gated Recurrent Units can be set to 64. In other embodiments, for instance, when employing concatenation in the decoder, the dimension of the decoder Gated Recurrent Units can be set to 128. The memory unit can have M=50 with L=30 such that each action can be linked to a set of 50 sentences, with each sentence having a maximum length of 30. During training of the intent neural network, a random selection can be used for M=50 memory slots for actions that have more than 50 annotations. Memories for actions having fewer annotations can be padded. Training of the intent neural network can be performed using a batch size of 128. In some embodiments, training of the intent neural network can alternatively train the network with a batch from user log data and then a batch from the tutorial data. Layer normalization can be used to accelerate the training process of the intent neural network.

During training of the intent neural network, the network can be updated based on the error. During training, error in the network can be determined using, for example, various types of loss (e.g., sequence loss, attention loss, etc.). Error can be determined based on differences between an output from the network and a ground truth output. The ground truth output is a known output corresponding to an input such that if the neural network is trained perfectly, the output from the network will be the same as the ground truth. Such errors can then be fed back through the intent neural network to appropriately train the neural network, for instance, by adjusting the weight of the network connections to reduce the value of the errors (e.g., updating the parameters of the network).

In some embodiments, sequence loss can be used to update the intent neural network for error. Sequence loss can be determined, for example, given ($s^i$, $s^{i+1}$) from a user, u, a session vector $h^i$ can be learned for $s^i$ using, for example, $h^i=g(h_T, h'_T)$. The intent neural network can then predict following actions, $s^{i+1}$, conditioned on $h^i$ with $f_{dec}$. In embodiments, $\hat{y}_t^{i+1}\in\mathbb{R}^{|V_w|}$ can be used as a one-hot vector of $a_t^{i+1}$ such that sequence loss can be defined for each user u as:

$$\mathcal{L}_u = -\sum_{s^{i+1}\in u}\sum_t y_t^{i+1}\cdot\log\hat{y}_t^{i+1},\ 1\le i\le N,$$

In such an equation, · can denote element-wise product and $\hat{y}_t^{i+1}$ based on $\hat{y}_t^{i+1}=\text{softmax}(W_a^T h_t^{i+1})$.

In embodiment, attention loss can be used to update the intent neural network for error. When using attention loss, the tutorial dataset can be treated as a special user (e.g., u') to focus modeling of semantic information from the dataset. For instance, given $\forall s\in u'$, there can be a ground truth annotation $\forall a_t\in s$. This ground truth can be indicative of memory labels $y_t'\in\mathbb{R}^K$ at each time step. As an example, attention loss can be designated to explicitly guide training of the recurrent semantic memory unit using:

$$\mathcal{L}_{u'} = -\sum_{s\in u'}\sum_t y_t'\cdot\log\hat{y}_t'$$

In such an equation, $y_t'$ can be a one-hot vector to index the correct memory slot in a corresponding memory unit M of $a_t$. In embodiments, $\hat{y}_t'$ can be directly given by the attentions weights in $$\alpha_k = \text{softmax}\,(e_t^T m_k) = \frac{\exp(e_t^T m_k)}{\sum_{k=1}^{K}\exp(e_t^T m_k)}(\text{e.g., } \hat{y}_t' = [\alpha_1, \ldots, \alpha_K]^T).$$

In embodiments, the intent neural network can be updated for loss using sequence loss and/or attention loss. Jointly considering sequence loss and attention loss can be combined using example equation:

$$\mathcal{L} = \sum_u \mathcal{L}_u + \lambda\mathcal{L}_{u'}$$

Such an equation can be used to sum all users' sequence loss and concurrently optimize for attention loss. In instances, λ>0 can be used to balance the training frequency between sequence loss and attention loss. Stochastic gradient descent optimization can be used to handle large-scale user log data (e.g., using a mini-batch strategy). For instance, $\{\theta_{enc\text{-}T},\theta_{enc\text{-}S},\theta_{dec},\theta_{mem}\}$ can be updated by minimizing loss (e.g., $\mathcal{L}_u$). In some instances, $\mathcal{L}_u'$ can be used to back-propagated through the gradient (e.g., $\{\theta_{enc\text{-}T},\theta_{enc\text{-}S},\theta_{mem}\}$).

The training process can be repeated for a sufficiently large number of cycles. For example, until the intent neural network converges to a state where error in the network is below a desired threshold of loss in the network (e.g. accuracy of the intent neural network). Such accuracy can be determined using a validation set of data. The validation set of data can be a timeframe of audio recording from the target dataset that was not used during training of the automatic speech recognition neural network (e.g., brand new data that still has a known ground truth that can be used to determine accuracy of the network).

Model implementation engine 212 can be used to implement the trained intent neural network. In some embodiments, the model implementation engine can operate in conjunction with intent model engine 210 during training of the intent neural network to train the network for a specific task. Such tasks can include user action prediction, user interest prediction, and/or log interpretation.

User action prediction component 222 can be used to implement the intent neural network to perform the task of user action prediction. For instance, user action(s) can be predicted using output from the intent neural network. Predicting a user's next action can be performed by implementing the intent neural network such that the log action decoder directly decodes (e.g., predicts) a following immediate action conditioned on a session vector obtained from a previous session. For example, a session can be input into and/or received by the intent neural network. The session can be comprised from user log data (e.g., indicative of a number of actions). From a sequence of actions (e.g., of the input session), the intent neural network can predict the next action for the sequence. In predicting the next action for the sequence, in some embodiments, a single predicted action can be output. In other embodiments, several actions can be selected and output. For instance, a top five predicted actions. Providing a number of top predicted actions can increase the likelihood that the correct action is predicted.

As an example, in an embodiment, when only one action is predicted based on a sequence of thirty actions, the likelihood that the action is the correct action can be over 55%. As an example, in an embodiment, when five actions are predicted based on a sequence of thirty actions, the likelihood that one of the predicted actions is the correct action can be over 81%. As another example, in an embodiment, when only one action is predicted based on a sequence of one hundred actions, the likelihood that the action is the correct action can be almost 60%. In still a further example, in an embodiment, when five actions are predicted based on a sequence of one hundred actions, the likelihood that one of the predicted actions is the correct action can be over 84%.

User interest prediction component 224 can be used to implement the intent neural network to perform the task of user interest prediction. For instance, user interest can be predicted using output from the intent neural network. Predicting a user's interest can be performed by implementing the intent neural network to infer the user's interest based on a user's log history. Such a prediction can be based on the inference that users sharing similar interests (e.g., occupation, self-disclosed tags, etc.) may have similar temporal patterns in user log data history for a software application. In embodiments, performing the task of user interest prediction can utilize a compact user representation (e.g., using a trained linear classifier). For instance, given a user u with log history $[s_1, \ldots, s_T]$, $h_u$ can be obtained by averaging the session vectors obtained using, for example, $h^i=g(h_T,h'_T)$. In this way, $h_u$ can equal $$\frac{1}{|u|}\sum_{s^i\in u} h^i.$$

The compact user representation can be formulated as a multi-label classification problem (e.g., using a trained linear classifier).

In some embodiments, a linear classifier can be trained for multi-label classification using $y_u=W_uh_u$, where $W_u$ can directly project user representation as a multi-label vector $y_u$. $W_u$ can be trained using sigmoid cross-entropy loss with limited memory Broyden-Fletcher-Goldfarb-Shanno (BFGS). Further, $h_u$ can be obtained using the intent neural network (e.g., $h_u$ is the output of the network).

In instances, a project tagging dataset can be used to train a linear classifier for multi-label classification. Such a project tagging dataset can include user data including self-disclosed interests (e.g., based on tagged projects created by a user). As an example, a self-disclosed interest can be identified using a project tag. Project tags can include graphic design, illustration, photography, branding, art direction, painting, digital photography, character design, print design, etc. Project tags can be based on the top tags identified from a project tagging dataset (e.g., 67 most commonly used tags). User of such a project tagging dataset can be the same and/or similar users as those for which user log data is collected. As an example, a user that creates content using both Photoshop and Behance (e.g., a social platform maintained by ADOBE creative cloud). In such a project tagging dataset, a percentage of the dataset can be used for training and the remaining sessions used for evaluations (e.g., 80% used in training and 20% used for validation).

During training of the linear classifier, the network can be updated for error. During training, error in the network can be determined using, for example, various types of loss (e.g., sigmoid cross-entropy loss with limited memory BFGS, etc.). Error can be determined based on differences between an output from the network and a ground truth output. The ground truth output is a known output corresponding to an input such that if the neural network is trained perfectly, the output from the network will be the same as the ground truth. As an example, self-disclosed interests related to the project tagging dataset associated with a user can be used as ground-truth for output related to predicted project tags for that user. Such errors can then be fed back through the linear classifier to appropriately train the neural network, for instance, by adjusting the weight of the network connections to reduce the value of the errors (e.g., updating the parameters of the network).

The user interest prediction component can be used to implement the intent neural network to perform the task of user interest prediction. Predicting a user's interest can be performed by implementing an intent neural network in conjunction with a linear classifier. For example, a session can be input into and/or received by the intent neural network. The session can be comprised from user log data (e.g., indicative of a number of actions). From a sequence of actions (e.g., of the input session), the intent neural network can generate session vectors related to a user. Such session vectors can encapsulate a long-term sequential pattern from user sessions of a software application with the assistance of an explanation (e.g., in human readable language) from tutorials.

The session vectors generated from the intent neural network can be averaged and input into and/or received by the linear classifier. The linear classifier can use the averaged session vectors to predict one or more project tags related to the user. In some embodiments, a single predicted user interest (e.g., based on a predicted project tag) can be output. In other embodiments, several predicted user interests can output (e.g., based on multiple predicted project tags). For instance, a top five user interests can be output by the linear classifier.

Log interpretation component 226 can be used to implement the intent neural network to perform the task of log interpretation. For instance, log interpretation can be performed using output from the intent neural network. Interpreting a user's log history in a human readable way can be performed by implementing the intent neural network such that the network outputs log annotations for actions of a user. A tutorial dataset can be used as the basis for performing log interpretation. The tutorial dataset can include human annotations for action sequences in tutorials related to a software program. For instance, a tutorial can be step-by-step instructions of how to perform a task in the software program (e.g., what actions to perform). Such a tutorial dataset can be used as an auxiliary knowledge source to explain action sequences performed by a user as the user interacts with a software program. For instance, log annotations can be formulated as memory slots related to each action. Such memory slots can be used to provide meaningful sentences for an action in an action sequence. Such a meaningful sentence can be based in part on temporal context of the action.

Log interpretation can be formulated as an annotation retrieval task using sentences from the tutorial dataset. Given an action sequence, $[a_1, \ldots, a_T]\in u'$, each action can be used to determine a related memory block M (e.g., from K annotation sentences). A ground-truth annotation index $y_t'\in\mathbb{R}^K$ can be used to determine the accuracy of the retrieved log interpretation (e.g., based on the retrieved annotation sentence from the tutorial dataset). The intent neural network can be trained such that the correct annotation is retrieved from M In an example, an action can be represented as a query (e.g., $a_t$). Such a query can be used to predict $y_t'$ (e.g., an annotation) for each action in the sequence. In embodiments, during training of the intent neural network, errors related to a retrieval from a memory slot in a corresponding memory unit can be corrected using attention loss.

For example, a session can be input into and/or received by the intent neural network. The session can be comprised from user log data of a sequence of actions. In generating log annotations for actions of a user session, in some embodiments, a single log annotation can be output for each action of the session. In other embodiments, several log annotations can be output for each action of the session. For instance, a top five log annotations related to an action. Providing a number of top log annotations can increase the likelihood that the most accurate log annotation is provided.

Despite potential limitations of topics covered by the tutorial dataset, the intent neural network can provide annotations for all common actions related to a software application. Further, the log annotations provided by the intent neural network can be impacted by the overall action sequence (e.g., based on context). Providing the log annotations as sentences can provide an alternative view for the unstructured log history of a user. Such an alternative view can be used to understand behavior of the user as the user interacts with the software application.

Figure 3:
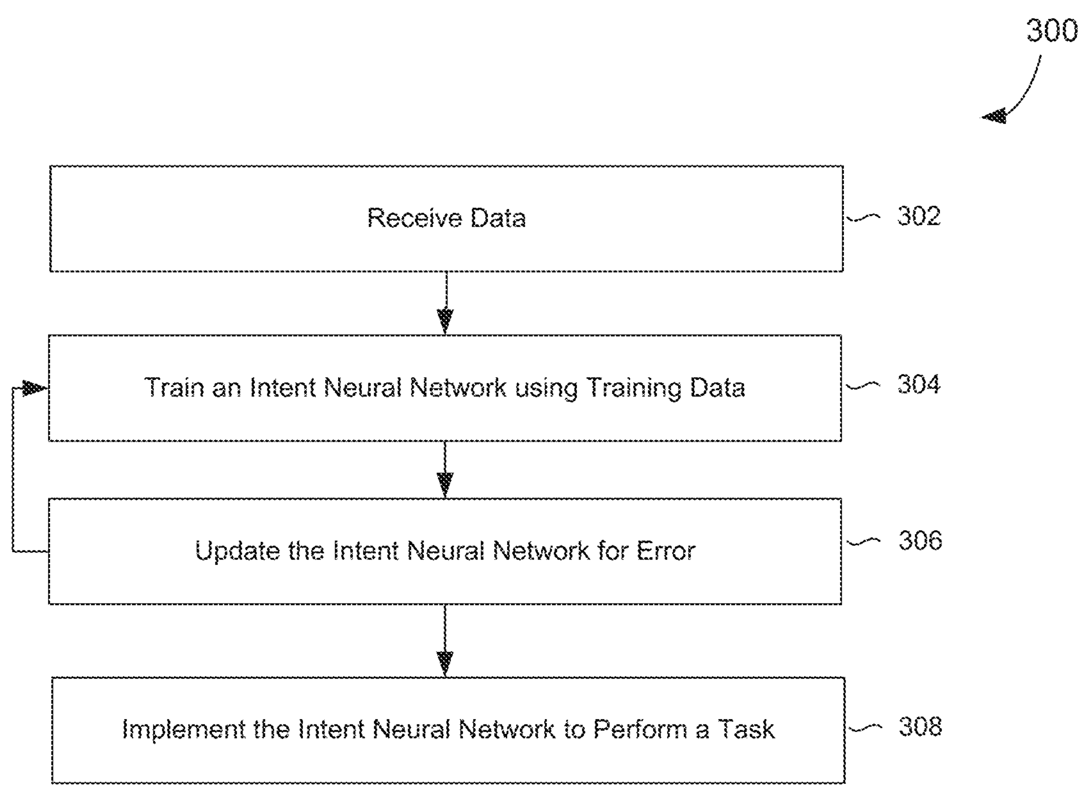
FIG. 3 depicts a process flow showing an embodiment for training an intent neural network as part of an interpretable user modeling system, in accordance with embodiments of the present disclosure.

With reference to FIG. 3, a process flow is provided showing an embodiment of method 300 for training an intent neural network as part of an interpretable user modeling system, in accordance with embodiments of the present disclosure. The interpretable user modeling system can be comprised one or more neural networks (e.g., an intent neural network). Such an interpretable user modeling system can train the intent neural network to bridge the semantic gap between log data and human language by leveraging tutorial data to understand the user logs in a semantically meaningful way. In this way, the interpretable user modeling system can implement the intent neural network to perform one or more tasks (e.g., user action prediction, user interest prediction, log interpretation). Aspects of method 300 can be performed, for example, by intent model engine 210 in conjunction with model implementation engine 212, as described with reference to FIG. 2.

At block 302, training data can be received. Such training data can be used to train an intent neural network of an interpretable user modeling system. Training data can include one or more datasets. For instance, training data for the intent neural network can include a user log dataset and a tutorial dataset. An intent neural network can be trained to interpret user behavior from any software program that can provide user log data and has associated data (e.g., text tutorials).

The user log dataset can be comprised of user log data related to a software program. In embodiments, user log data can contain sessions from one or more users as the users interact with a software program. In some embodiments, a session can be designated based on user activity per a designated time unit (e.g., user actions occurring within a predefined time window—5, minutes, 10 minutes, 15 minutes). When user activity exceeds the designated time unit, the user activity can be divided into user sessions with a size no larger than the predefined time window.

The tutorial dataset can be comprised of human annotations for action sequences in tutorials related to a software program. For instance, a tutorial can be step-by-step instructions of how to perform a task in the software program (e.g., what actions to perform). A tutorial dataset can be created by processing tutorials such that an action can correspond to a user action performed within the software program. For instance, sentences of the tutorial dataset can be linked to actions from, for example, the user log dataset.

The user log dataset and/or tutorial dataset can each be divided into a training set and a validation set. The training set can be used to train the intent neural network (e.g., update parameters/weights of the network based on error in the network). The validation set can be used to validate the trained intent neural network for accuracy. In embodiments, a percentage of the sessions in the user log dataset can be used for training and the remaining sessions used for evaluations (e.g., 90% used in training and 10% used for validation). In embodiments, a percentage of the tutorial sequences in the tutorial dataset can be used for training and the remaining tutorial sequences used for evaluations (e.g., 95% used in training and 5% used for validation).

At block 304, an intent neural network can be trained using the training data. The intent neural network can be implemented using modified encoder-decoder framework. For instance, an encoder-decoder neural network architecture can be used for such a neural network. In embodiments, layer normalization can be used to accelerate the training process of the intent neural network. During training of the intent neural network, the network can alternatively be trained using a batch of the user log data and then a batch of the tutorial data. The learning rate of the network can be set to 0.001.

In embodiments, to train the intent neural network, a session can be input into the network. A session can contain a set of actions indicative of use of the software program by a user. Such a session can be comprised of a number of actions (e.g., the number set based on a maximum time step). In some embodiments, a maximum number of actions is 30. In other embodiments, the maximum number of actions is 100. Session to session, length can vary (e.g., 20 to 30; 80 to 100).

While the session may be input in raw form, prior to the intent neural network receiving the session, embedding layers of the intent neural network can be used to process the session. For instance, the session can be processed such that the actions of the session are projected into a continuous vector space. In this way, as actions of the session are processed by the intent neural network, the actions can be represented in vector form. Such processing can take place using, for example, an embedding matrix (e.g., as the embedding layer). The embedding matrix can be used to look up a vector that corresponds to an action of the session.

The action (e.g., in vector form) can be received by a temporal encoder of the intent neural network. A hidden representation can be generated by the temporal encoder for each action of the session. The entire session can then be represented using, for example, a last hidden state (e.g., a combination of the hidden representations generated for each action of the session).

Sentences from the tutorial data can also be processed into a continuous vector space (e.g., converted to vector form). For instance, each sentence from the tutorial data can represented using a vector. To represent the relationship between the sentences from the tutorial data and user actions, two embedding matrixes can be used: one for memory addressing and the other for memory reading. Memory addressing can generally receive query (e.g., an action in vector form) that can be used to determine embedded actions related to sentences from the tutorial data. Memory reading can generally determine one or more relevant sentences from the tutorial data based on the embedded action determined using memory addressing. A relevant sentence can be based on similarity between an action vector related to a tree of sentences and the action of the query. Such a tree can include representations of sentences from the tutorial data.

Such memory addressing and memory reading can be performed for the actions of the input session. For instance, an action of the session can be submitted as a query for memory addressing. During memory addressing, an embedded action related to sentences from the tutorial data can be determined. This embedded action can then be used for memory reading to determine a relevant sentence from the tutorial data. The context of an action can be taken into account (e.g., based on the embedding of the action) such that an action corresponds to a sentence group such that a sentence can be identified based on context of the action. A sentence can be identified based on the highest similarity between the query and the sentences from the tutorial data.

The identified sentences can represented as a semantic context vector. Such a semantic context vector can be used to help determine a semantic hidden state. The semantic hidden state can be the combination of the hidden state for an action and the semantic context vector related to the identified sentence.

A session vector that includes both temporal context and semantic information can be generated. In embodiments, the session vector can be the summation of the hidden state of a representation and the semantic representation for a session. In other embodiments, the session vector can be the concatenation of the hidden state of a representation and the semantic representation for a session. Such a session vector can encapsulate the action sequence from the session (e.g., 30 actions, 100 actions).

The decoder of the intent neural network can be used to output an action prediction. The action prediction can be actions predicted to follow the actions of the session. The action prediction can then be used to identify a related sentence for the predicted action.

At block 306, the intent neural network can be updated for error. During training, error in the network can be determined using, for example, various types of loss (e.g., sequence loss, attention loss, etc.). Error can be determined based on differences between an output from the network and a ground truth output. The ground truth output is a known output corresponding to an input such that if the neural network is trained perfectly, the output from the network will be the same as the ground truth. Such errors can then be fed back through the intent neural network to appropriately train the neural network, for instance, by adjusting the weight of the network connections to reduce the value of the errors (e.g., updating the parameters of the network). In instances, sequence loss can be determined based in differences between a ground-truth action vector and the predicted action vector. In other instances, attention loss can be determined by comparing the sentence predicted with the highest probability corresponds to the ground-truth sentence.

Blocks 304 and 306 can be repeated for a sufficiently large number of cycles. For example, training and updating of the intent neural network can continue until the network converges to a state where error in the network is below a desired threshold of loss in the network (e.g. accuracy of the intent neural network). In embodiments, accuracy can be determined using a validation set of data. The validation set of data can be a timeframe of audio recording from the target dataset that was not used during training of the automatic speech recognition neural network (e.g., brand new data that still has a known ground truth that can be used to determine accuracy of the network).

At block 308, the trained intent neural network can be implemented to perform a task. Such tasks can include user action prediction, user interest prediction, and/or log interpretation. Predicting a user's next action can be performed by implementing the intent neural network such that the log action decoder directly decodes (e.g., predicts) a following immediate action conditioned on a session vector obtained from a previous session. Predicting a user's interest can be performed by implementing the intent neural network to infer the user's interest based on a user's log history. Interpreting a user's log history in a human readable way can be performed by implementing the intent neural network such that the network outputs log annotations for actions of a user. Implementing the intent neural network is discussed further with reference to model implementation engine 212 (e.g., user action prediction component 222, user interest prediction component 224, and/or log interpretation component 226).

Figure 4:
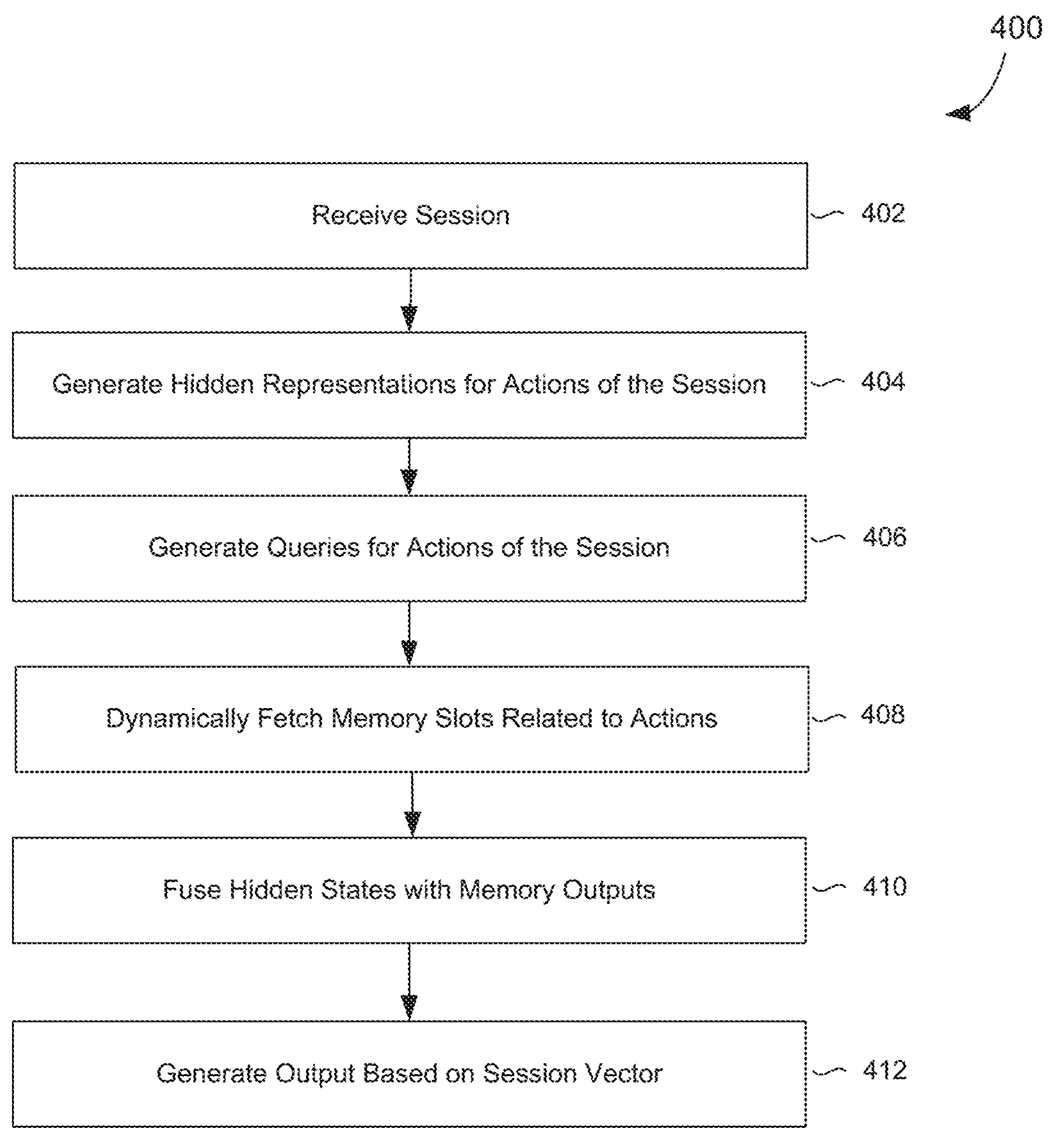
FIG. 4 depicts a process flow showing an embodiment for implementing an intent neural network as part of an interpretable user modeling system, in accordance with embodiments of the present disclosure.

With reference to FIG. 4, a process flow is provided showing an embodiment of method 400 for implementing an intent neural network as part of an interpretable user modeling system, in accordance with embodiments of the present disclosure. The interpretable user modeling system can be comprised one or more neural networks (e.g., an intent neural network). Such an interpretable user modeling system can implement an intent neural network that bridges the semantic gap between log data and human language to interpret user logs in a semantically meaningful way. In this way, the interpretable user modeling system can implement an intent neural network to perform one or more tasks (e.g., user action prediction, user interest prediction, log interpretation). Aspects of method 400 can be performed, for example, by intent model engine 210 in conjunction with model implementation engine 212, as described with reference to FIG. 2.

At block 402, a session can be received. The session can be input into an intent neural network. A session can contain a set of actions indicative of use of the software program by a user. Such a session can be comprised of a number of actions (e.g., the number set based on a maximum time step). In some embodiments, a maximum number of actions is 30. In other embodiments, the maximum number of actions is 100. Session to session, length can vary (e.g., 20 to 30; 80 to 100).

While the session may be input in raw form, prior to the intent neural network receiving the session, embedding layers of the intent neural network can be used to process the session. For instance, the session can be processed such that the actions of the session are projected into a continuous vector space. In this way, as actions of the session are processed by the intent neural network, the actions can be represented in vector form. Such processing can take place using, for example, an embedding matrix (e.g., as the embedding layer). The embedding matrix can be used to look up a vector that corresponds to an action of the session.

At block 404, hidden representations can be generated for actions of the session. A hidden representation can be generated by the temporal encoder for each action of the session. The entire session can then be represented using, for example, a last hidden state (e.g., a combination of the hidden representations generated for each action of the session).

At block 406, queries can be generated for actions of the session. A query can be projected into memory embedding space. For instance, the query can include a hidden state of an action and action embedding. In embodiments, the query can be used in relation to a memory unit. Such a memory unit can be a recurrent semantics memory unit. The memory unit can contain sentence units from a tutorial dataset. The tutorial dataset can be comprised of human annotations for action sequences in tutorials related to a software program. For instance, a tutorial can be step-by-step instructions of how to perform a task in the software program (e.g., what actions to perform).

At block 408, memory slots related to actions can dynamically be fetched. This embedded action can then be used for memory reading to determine a relevant sentence from the tutorial data. The query can be used compute attention weights between the query and the sentence units. For instance, to determine probabilities for the sentences stored in the memory model. The context of an action can be taken into account (e.g., based on the embedding of the action) such that an action corresponds to a sentence group such that a sentence can be identified based on context of the action. A sentence can be identified based on the highest similarity between the query and the sentences from the tutorial data. The identified sentences can represented as a semantic context vector. Such a semantic context vector can be used to help determine a semantic hidden state. The semantic context vector can be the combination of the hidden state for an action and the semantic context vector related to the identified sentence.

At block 410, hidden states can be fused with memory outputs. Hidden states can be those generated, for example, by a temporal encoder. The memory outputs generated, for example, by a semantic encoder. In particular, in embodiments, a session vector that includes both temporal context and semantic information can be generated. In embodiments, the session vector can be the summation of the hidden state of a representation and the semantic representation for a session. In other embodiments, the session vector can be the concatenation of the hidden state of a representation and the semantic representation for a session. Such a session vector can encapsulate the action sequence from the session (e.g., 30 actions, 100 actions).

At block 412, an output can be generated based on a session vector. The session vector can include both temporal context and semantic information. In embodiments, a log action decoder of the intent neural network can output (e.g., predict) an action conditioned on a session vector obtained from a previous session. For example, from a sequence of actions (e.g., of the input session), the intent neural network can predict the next action for the sequence. In other embodiments, the intent neural network can operate in conjunction with a trained linear classifier to output one or more project tags related to a user (e.g., indicating a predicted user interest). In further embodiments, the intent neural network can output one or more log annotations for actions of a user.

Figure 5:
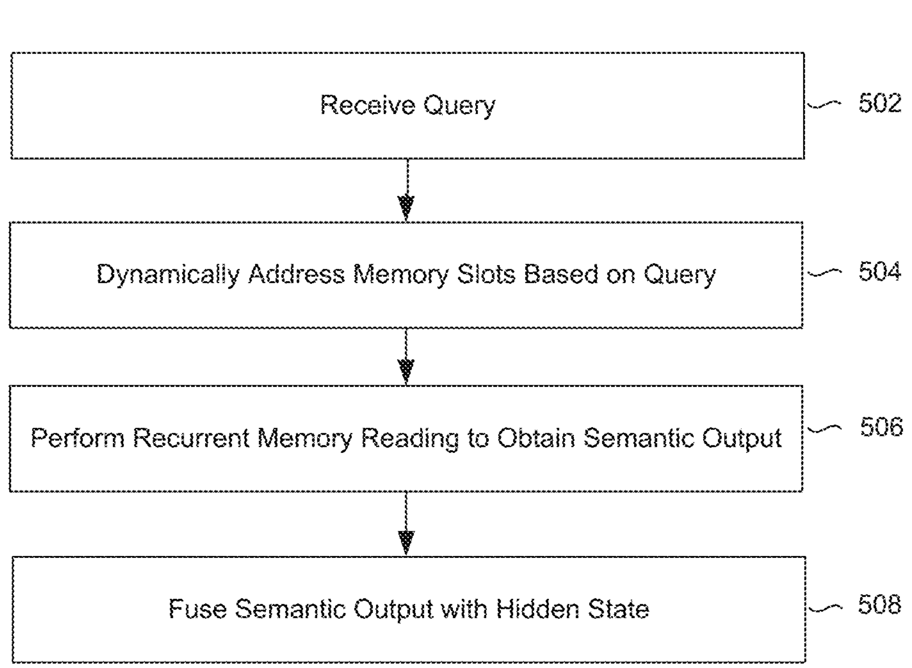
FIG. 5 depicts a process flow showing an embodiment for implementing a memory unit as part of an intent neural network, in accordance with embodiments of the present disclosure.

With reference to FIG. 5, a process flow is provided showing an embodiment of method 500 for implementing a memory unit as part of an intent neural network, in accordance with embodiments of the present disclosure. The memory unit can capture information from tutorial data. The memory unit can be comprised of a set of sentences collected from human annotations for log sequence in software tutorials. Such a memory unit can be queried to identify human readable sentences related to actions (e.g., from a log sequence). Aspects of method 500 can be performed, for example, by memory unit element 220 of semantic component 216 as related to intent model engine 210, as described with reference to FIG. 2.

At block 502, a query can be received. The query can contain information related to an action of a session. For instance, the information can include the action (e.g., in vector form) and hidden representation for the action (e.g., generated using a temporal encoder).

At block 504, memory slots can be dynamically addressed based on the query. Such a query can be projected into the memory embedding space. Projecting the query into the memory embedding space can be used to obtain attention weights based on the memory slots (e.g., sentences from software tutorials). An attention weight can indicate how related the query is to a sentence.

At block 506, recurrent memory reading can be performed to obtain semantic output. Attention weights (e.g., obtained at block 504) can be used to generate the sematic output. Semantic output can be represented as a semantic context vector. Such a semantic context vector can indicate attention weights and related sentences. The semantic context vector can indicate one or more sentences most related to an action from a session.

At block 508, a semantic output can be fused with a hidden state. Hidden states can be those generated, for example, by a temporal encoder. The memory outputs generated, for example, by a semantic encoder. In particular, in embodiments, a session vector that includes both temporal context and semantic information can be generated. In embodiments, the session vector can be the summation of the hidden state of a representation and the semantic representation for a session. In other embodiments, the session vector can be the concatenation of the hidden state of a representation and the semantic representation for a session. Such a session vector can encapsulate the action sequence from the session (e.g., 30 actions, 100 actions).

Figure 6:
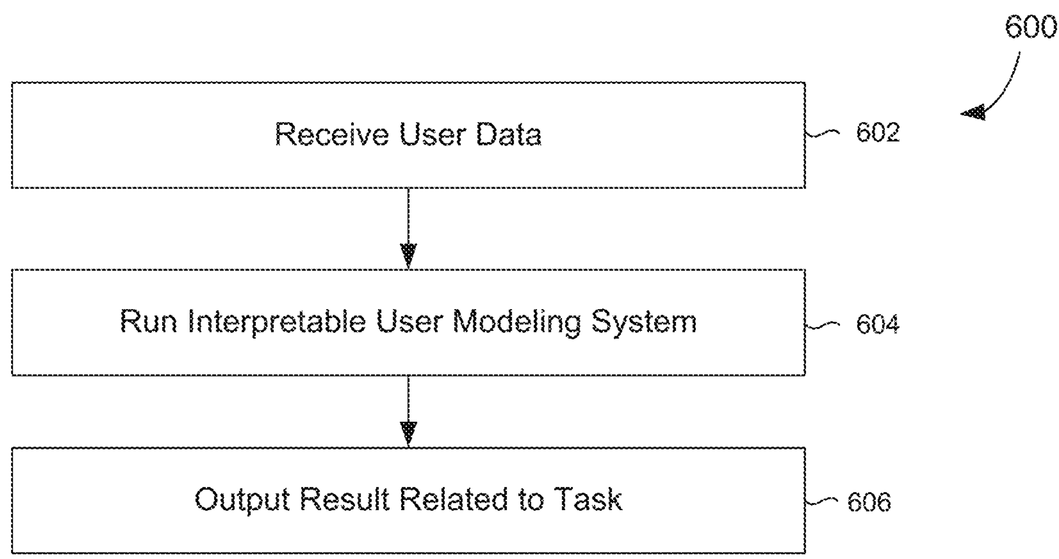
FIG. 6 depicts a process flow showing an embodiment for implementing an interpretable user modeling system, in accordance with embodiments of the present disclosure.

With reference to FIG. 6, a process flow is provided showing an embodiment of method 600 for implementing an interpretable user modeling system, in accordance with embodiments of the present disclosure. The interpretable user modeling system can implement an intent neural network to perform one or more tasks (e.g., user action prediction, user interest prediction, log interpretation). Aspects of method 600 can be performed, for example, by intent model engine 210 in conjunction with model implementation engine 212, as described with reference to FIG. 2.

At block 602, user data can be received. In embodiments, such user data can be user log data. User log data can be organized as sessions. A session can contain a set of actions indicative of use of the software program by a user. Such a session can be comprised of a number of actions (e.g., the number set based on a maximum time step of actions). In some embodiments, a maximum number of actions is 30. In other embodiments, the maximum number of actions is 100. Session to session, length can vary (e.g., 20 to 30; 80 to 100).

At block 604, an interpretable user modeling system can be run. The interpretable user modeling system can be comprised of one or more neural networks (e.g., a pre-trained embedding neural network, an intent neural network, and/or a linear classifier neural network). Embedding layers of a pre-trained embedding neural network can be used to process the session. For instance, the session can be processed such that the actions of the session are projected into a continuous vector space. In this way, as actions of the session can be processed prior to input into the intent neural network, such that the actions can be represented in vector form. Such processing can take place using, for example, an embedding matrix (e.g., as the embedding layer). The embedding matrix can be used to look up a vector that corresponds to an action of the session.

Such a vector can be received by an intent neural network. The intent neural network can bridge a semantic gap between log data and human language by leveraging tutorial data to understand the user logs in a semantically meaningful way. For instance, a memory unit of the intent neural network can capture information from tutorial data. The memory unit can be comprised of a set of sentences collected from human annotations for log sequence in software tutorials. Such a memory unit can be queried to identify human readable sentences related to actions received by the intent neural network (e.g., from a log sequence). In some embodiments, for instance, when performing the task of user interest prediction, a linear classifier neural network can be used to predicting a user's interest by outputting one or more project tags related to the user (e.g., that indicate user interest).

At block 606, a result can be output related to a task. In embodiments, the task can be user action prediction. In user action prediction, a log action decoder of the intent neural network can output (e.g., predict) an action conditioned on a session vector obtained from a previous session. For example, from a sequence of actions (e.g., of the input session), the intent neural network can predict the next action for the sequence. In other embodiments, the task can be user interest prediction. In user interest prediction, the intent neural network can operate in conjunction with a trained linear classifier to output one or more project tags related to a user (e.g., indicating a predicted user interest). In further embodiments, the task can be log interpretation. In log interpretation, the intent neural network can output one or more log annotations for actions of a user.

Figure 7:
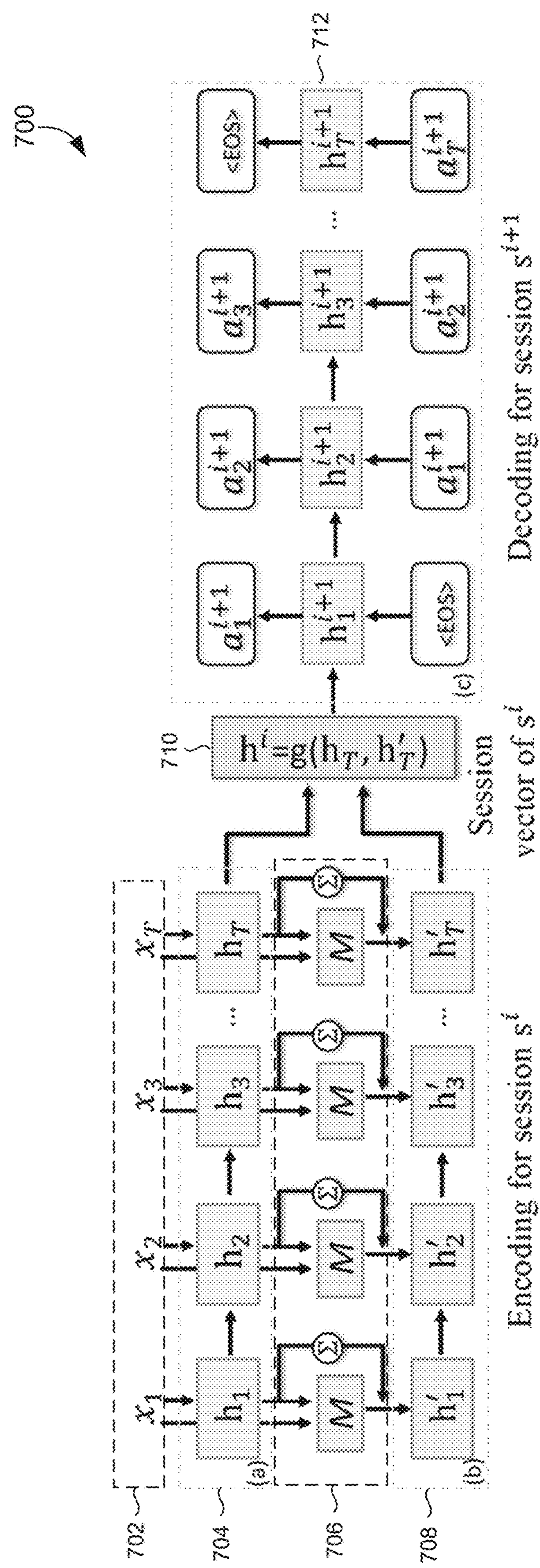
FIG. 7 illustrates an example environment that can be used for training and/or implementing an intent neural network as part of an interpretable user modeling system, in accordance with embodiments of the present disclosure.

FIG. 7 illustrates an example environment 700 that can be used for training and/or implementing an intent neural network as part of an interpretable user modeling system, in accordance with embodiments of the present disclosure. As depicted, the intent neural network can be implemented using a modified encoder-decoder framework.

Input 702 can be a session. A session can contain a set of actions indicative of use of the software program by a user. Such a session can be comprised of a number of actions (e.g., the number set based on a maximum time step). In embodiments, embedding layers of a network (e.g. a pre-trained embedding neural network or the intent neural network) can be used to process the session. For instance, the session can be processed such that the actions of the session are projected into a continuous vector space. A temporal encoder can process input 702 to generate hidden vector representations 704 (e.g., $h^1$ to $h_T$). Such hidden representation can correspond to each action of the input session (e.g., 702).

Memory unit 706 can receive input 702 along with hidden representations 704. The memory unit can queried to identify human readable sentences related to actions. The query can contain information related to an action related to a user interaction with a software program. For instance, the information can include the action (e.g., in vector form) and hidden representation for the action (e.g., generated using a temporal encoder). The memory unit can be comprised of a set of sentences collected from human annotations for log sequence in software tutorials. Recurrent memory addressing and recurrent reading can be performed to obtain semantic output. Semantic output 708 can be represented as a semantic context vector. Such a semantic context vector can indicate attention weights and related sentences. The semantic context vector can indicate one or more sentences most related to an action from a session.

Semantic output can be fused with hidden states to generate session vector 710. Session vector 710 can include both temporal context and semantic information. In embodiments, the session vector can be the summation of the hidden state of a representation and the semantic representation for a session. In other embodiments, the session vector can be the concatenation of the hidden state of a representation and the semantic representation for a session.

Log action decoder 712 can be fed with a previous action to predict the next action conditioned on the last hidden state. In this way, the intent neural network can capture long-term temporal information and generate interpretable results (e.g., using a memory unit to exploit an auxiliary tutorial data). In some embodiments, log action decoder 712 can be used to predict an action conditioned on a session vector obtained from a previous session (e.g., from a sequence of actions predict the next action for the sequence). In other embodiments, output from log action decoder 712 can be used by a trained linear classifier to output one or more project tags related to a user (e.g., indicating a predicted user interest). In further embodiments, log action decoder 712 can output information that can be used to determine one or more log annotations for actions of a user.

Figure 8:
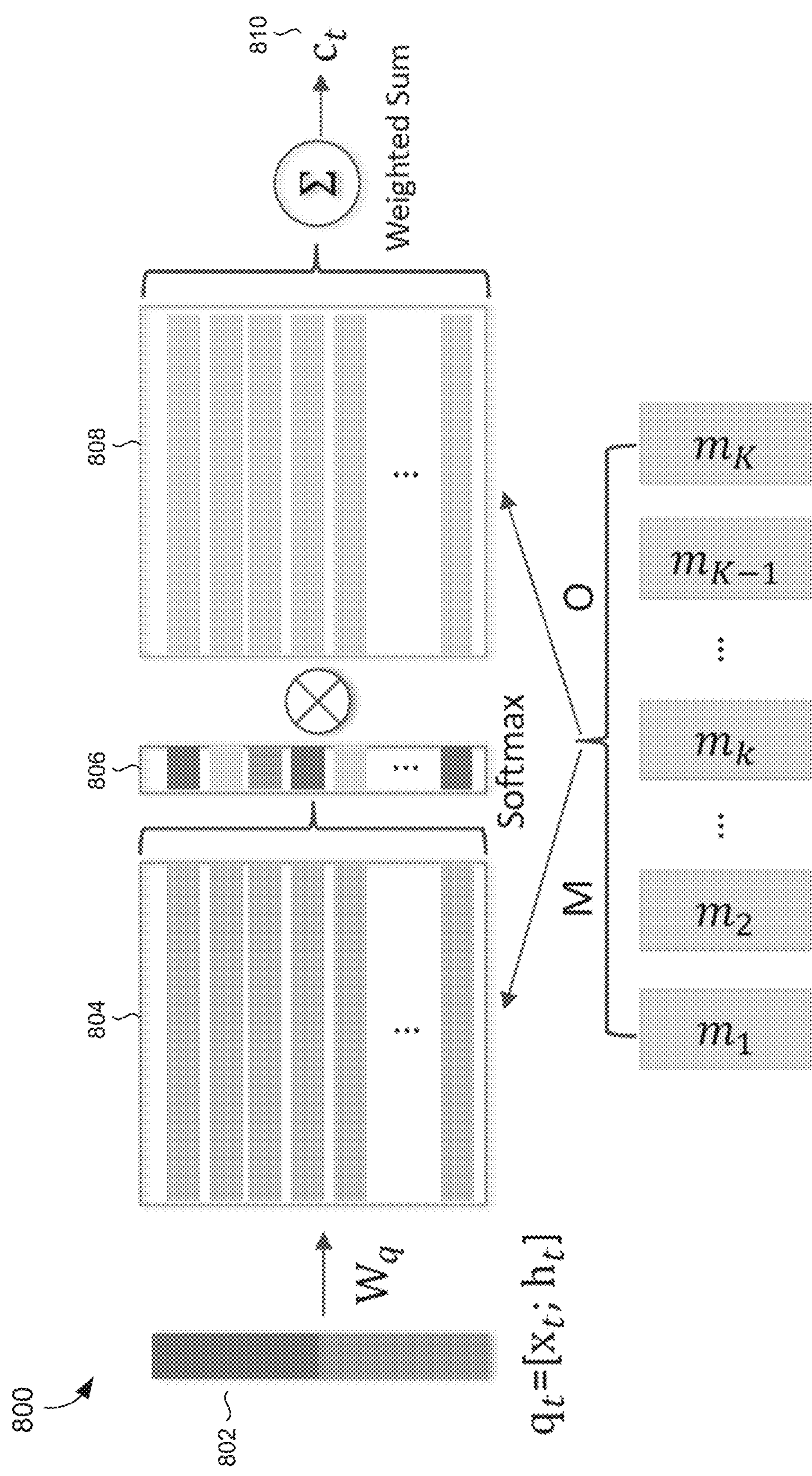
FIG. 8 illustrates an example environment that can be used for training and/or implementing a memory unit as part of an intent neural network, in accordance with embodiments of the present disclosure.

FIG. 8 illustrates an example environment 800 that can be used for training and/or implementing a memory unit as part of an intent neural network, in accordance with embodiments of the present disclosure, in accordance with embodiments of the present disclosure.

Query 802 can relate to an action. For instance, query 802 can include the action (e.g., in vector form) and a hidden representation of the action (e.g., generated using a temporal encoder). This query can be projected into a memory embedding space (e.g., using W). Recurrent memory addressing 804 can be used to dynamically address memory slots based on query 802. The dynamically addressed memory slots can be used to obtain attention weights using softmax 806 (e.g., for sentences from software tutorials). An attention weight can indicate how related the query is to a sentence. Recurrent memory reading 808 can be used to write semantic output 810 after the attention weights are obtained (e.g., using softmax 806). Semantic output 810 can be represented as a semantic context vector. Such a semantic context vector can indicate the weighted sum of the attention weights and related sentences. The semantic context vector can indicate one or more sentences most related to an action from a session.

Figure 9:
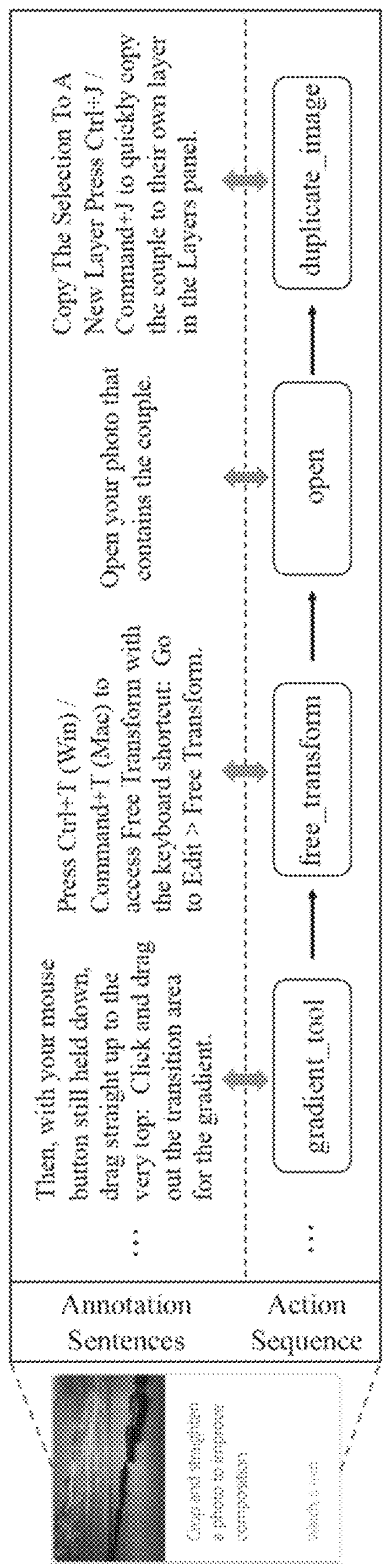
FIG. 9 illustrates an example of tutorial data used for training an intent neural network, in accordance with embodiments of the present disclosure.

FIG. 9 illustrates an example of tutorial data used for training an intent neural network, in accordance with embodiments of the present disclosure. Such tutorial data can be part of a tutorial dataset. The tutorial dataset can include human annotations for action sequences in tutorials related to a software program. For instance, a tutorial can be step-by-step instructions of how to perform a task in the software program (e.g., what actions to perform). Such a tutorial dataset can be used as an auxiliary knowledge source to explain action sequences performed by a user as the user interacts with a software program. As depicted, the tutorial data includes a sequence of actions and corresponding annotated sentences. The annotated sentences can describe the action at each step of the sequence.

FIGS. 10A and 10B illustrate examples of outputs related to performing the task of log interpretation using intent neural network of an interpretable user modeling system, in accordance with embodiments of the present disclosure. Interpreting a user's log history in a human readable way can be performed by implementing the intent neural network such that the network outputs log annotations for actions of a user. A session can be input into and/or received by an intent neural network. The session can be comprised from user log data of a sequence of actions.

As depicted in FIG. 10A, the actions of the sequence can be [open], [crop_tool], [layer_via_copy], [new_curves_layer], [new_levels_layer], and [zoom_in_tool]. As depicted in FIG. 10B, the actions of the sequence can be [open], [rectangular_marquee], [rectangualr_marquee_tool], [paste], [eraser], [brush_tool], [eraser], [brush_tool], and [move]. In generating log annotations for actions of a user session, as depicted, a single log annotation can be output for each action of the session. The log annotations provided by the intent neural network can be impacted by the overall action sequence (e.g., based on context). For example, in FIG. 10B, the log annotation provided for the first instance of [brush_tool] differs from log annotation provided for the second instance of [brush_tool].

Figure 11:
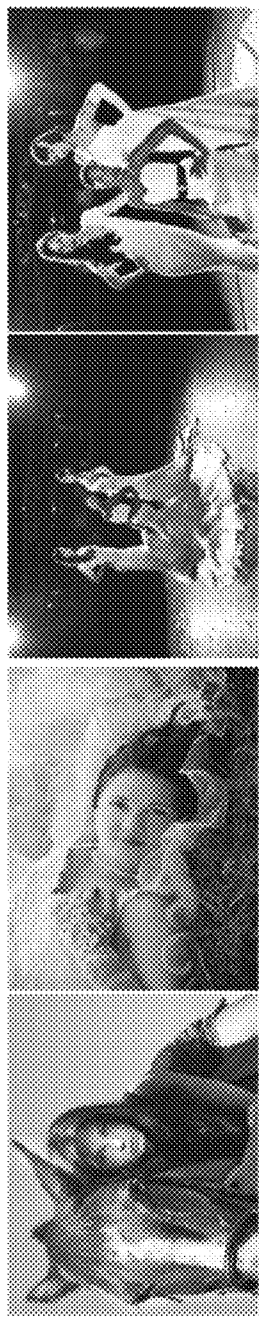
FIG. 11 illustrates an example of an output related to performing the task of user interest prediction using an interpretable user modeling system, in accordance with embodiments of the present disclosure.

FIG. 11 illustrates an example of an output related to performing the task of user interest prediction using an interpretable user modeling system, in accordance with embodiments of the present disclosure. The interpretable user modeling system can use an intent neural and a linear classifier to perform user interest prediction. Predicting a user's interest can be performed by implementing the intent neural network to infer the user's interest based on a user's log history. Such a prediction can be based on the inference that users sharing similar interests (e.g., occupation, self-disclosed tags, etc.) may have similar temporal patterns in user log data history for a software application. In embodiments, performing the task of user interest prediction can utilize a compact user representation (e.g., using a trained linear classifier).

As depicted, project tags predicted in 1102 can include photography, digital photography, fine art, graphic design, and performing arts. As comparted to ground-truth tags (e.g., self-disclosed project tags), there is an overlap for the first three predicted project tags: photography, digital photography, fine art. In addition to predicting the ground-truth tags, the interpretable user modeling system can predict highly related project tags. After training, the interpretable user modeling system can be used to perform user interest prediction by predicting project tags related to a user.

Figure 12:
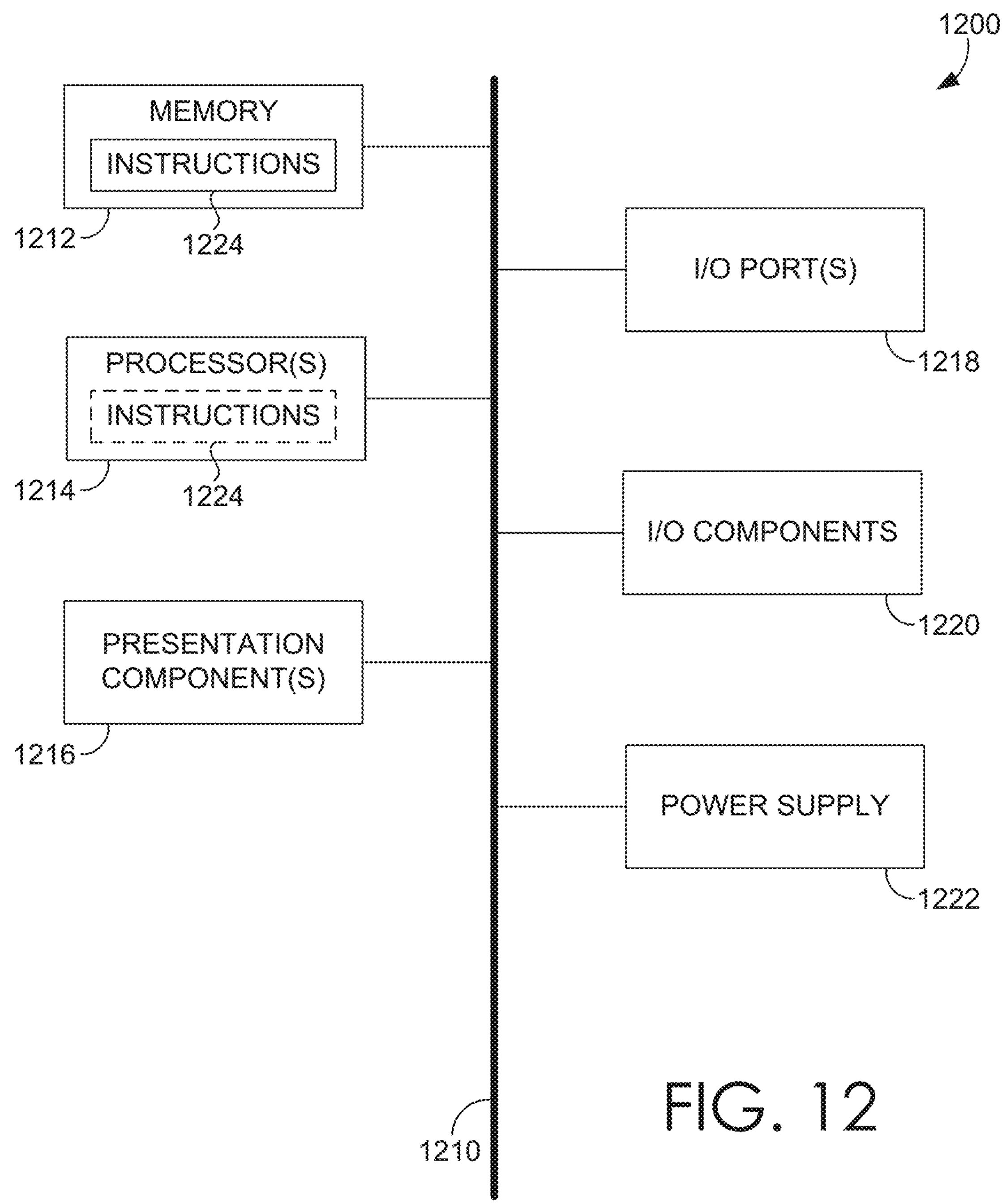
FIG. 12 is a block diagram of an example computing device in which embodiments of the present disclosure may be employed.

With reference to FIG. 12, computing device 1200 includes bus 1210 that directly or indirectly couples the following devices: memory 1212, one or more processors 1214, one or more presentation components 1216, input/output (I/O) ports 1218, input/output components 1220, and illustrative power supply 1222. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 12 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1200. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1212 includes computer storage media in the form of volatile and/or nonvolatile memory. As depicted, memory 1212 includes instructions 1224. Instructions 1224, when executed by processor(s) 1214 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 1200 includes one or more processors that read data from various entities such as memory 1212 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc. I/O components 1220 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 1200. Computing device 1200 may be equipped with depth cameras, such as stereoscopic camera systems, infrared camera systems, RGB camera systems, and combinations of these, for gesture detection and recognition. Additionally, computing device 1200 may be equipped with accelerometers or gyroscopes that enable detection of motion. The output of the accelerometers or gyroscopes may be provided to the display of computing device 1200 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable media having a plurality of executable instructions embodied thereon, which, when executed by one or more processors, cause the one or more processors to perform a method, the method comprising:

receiving a user session, wherein the user session comprises actions related to a software program;

identifying, using an intent neural network, human readable sentences related to the actions;

generating, using the intent neural network, a session vector, wherein the session vector comprises temporal context from the actions of the user session and semantic information, the semantic information being based on the human readable sentences from a tutorial dataset related to the actions;

generating an output based on the session vector, wherein the output is related to a particular tasks;

generating a query related to an action from the user session, wherein the query indicates the action and a hidden state of the action; and performing recurrent memory addressing using the query to obtain attention weights related to the human readable sentences from the tutorial dataset, wherein each of the attention weights indicates similarity between a sentence from the human readable sentences and the query.

2. The media of claim 1, wherein the particular task is unstructured data interpretation.

3. The media of claim 1, the method further comprising:

performing recurrent memory addressing for additional queries related to the actions of the session; and performing recurrent memory reading to generate a semantic context vector that indicates a set of attention weights for the queries, including the query, in relation to the human readable software tutorial sentences for the actions from the user session.

4. The media of claim 3, the method further comprising:

combining the semantic context vector with a hidden state to generate the session vector, wherein the hidden state represents hidden representations for the actions from the user session.

5. The media of claim 1, the method further comprising:

training the intent neural network, wherein training comprises:

receiving a training session, identifying training human readable sentences related to training actions from the training session, generating a training session vector, generating a training output based on the training session vector, determining error based on differences between the training output and a ground-truth output, and updating the intent neural network based on the error.

6. The media of claim 5, wherein the error is determined using one or more of sequence loss and attention loss.

7. The media of claim 1, wherein the particular task is at least one of user action prediction, user interest prediction, and log interpretation.

8. The media of claim 1, the method further comprising:

using a linear classifier to predict a project tag related to a user that generated the user session, wherein the project tag is predicted from the session vector generated by the intent neural network.

9. A computer-implemented method comprising:

receiving a session of actions, the actions related to interactions of a user with a software program;

generating a query related to an action from the session, wherein the query comprises the action and a hidden state of the action;

identifying attention weights related to human readable sentences, from instructions relating to a task in the software program, in relation to the action based on the query;

generating a session vector comprising temporal context from the actions of the user session and semantic information, wherein the semantic information is based on a set of attention weights related to the human readable sentences;

generating an output based on the session vector, wherein the output is related to a particular task; and creating a memory unit using tutorial data indicating human readable annotations related to actions performed in a software program, the human readable annotations represented as the human readable sentences.

10. The computer-implemented method of claim 9, further comprising:

performing recurrent memory addressing using the query to obtain the attention weights related to the human readable sentences, wherein the attention weights indicates similarity between a sentence from the human readable sentences and the query;

performing recurrent memory addressing for additional queries related to the actions of the session; and performing recurrent memory reading to generate a semantic context vector that indicate the set of attention weights for the queries, including the query, in relation to the human readable sentences.

11. The computer-implemented method of claim 9, further comprising:

combining the semantic context vector with the hidden state to generate the session vector, wherein the hidden state represents hidden representations for the actions from the user session.

12. The computer-implemented method of claim 9, wherein an intent neural network performs receiving the session of actions, generating the query, identifying the attention weights, and generating the session vector.

13. The computer-implemented method of claim 12, further comprising: training an intent neural network, wherein training comprises:

receiving a training session, identifying training human readable sentences related to training actions from the training session, generating a training session vector, generating a training output based on the training session vector, determining error based on differences between the training output and a ground-truth output, and updating the intent neural network based on the error.

14. The computer-implemented method of claim 13, wherein the error is determined using one or more of sequence loss and attention loss.

15. The computer-implemented method of claim 9, wherein the particular task is unstructured data interpretation.

16. The computer-implemented method of claim 9, wherein the particular task is at least one of user action prediction, user interest prediction, and log interpretation.

17. The computer-implemented method of claim 9, further comprising:

using a linear classifier to predict a project tag related to a user that generated the user session, wherein the project tag is predicted from the session vector generated by the intent neural network.

18. A computing system comprising one or more non-transitory computer-readable media having a plurality of executable instructions embodied thereon, which, when executed by one or more processors, cause the one or more processors to perform a method, the method comprising:

receiving a set of actions related to interactions of a user with a software program;

generating a query related to an action from the set of actions, wherein the query indicates the action and a hidden state of the action;

identifying attention weights related to human readable sentences, from instructions in the software program, in relation to the action based on the query;

generating a vector comprising context from the set of actions and semantic information, wherein the semantic information is based on a set of attention weights related to the human readable sentences;

generating an output based on the vector, wherein the output is related to a task; and creating a memory unit using tutorial data indicating human readable annotations related to actions performed in a software program, the human readable annotations represented as the human readable sentences.

19. The system of claim 18, further comprising:

using a linear classifier to predict a project tag related to a user that generated the set of action, wherein the project tag is predicted from the vector.

20. The system of claim 18, wherein the task is at least one of user action prediction, user interest prediction, and log interpretation.

* * * * *